US009185389B2

(12) United States Patent
Aoki

(10) Patent No.: US 9,185,389 B2
(45) Date of Patent: Nov. 10, 2015

(54) IMAGING DEVICE AND IMAGING METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/186,510

(22) Filed: Feb. 21, 2014

(65) Prior Publication Data

US 2014/0168387 A1 Jun. 19, 2014

Related U.S. Application Data

(63) Continuation of application No. PCT/JP2012/065835, filed on Jun. 21, 2012.

(30) Foreign Application Priority Data

Aug. 30, 2011 (JP) ................... 2011-187561

(51) Int. Cl.
H04N 13/02 (2006.01)
G02B 17/00 (2006.01)
G02B 7/34 (2006.01)
G02B 7/36 (2006.01)
(Continued)

(52) U.S. Cl.
CPC ............ *H04N 13/0207* (2013.01); *G02B 7/285* (2013.01); *G02B 7/34* (2013.01); *G02B 7/36* (2013.01); *H04N 5/232* (2013.01); *H04N 5/23212* (2013.01); *H04N 5/3696* (2013.01); *H04N 13/0025* (2013.01); *H04N 13/0217* (2013.01); *H04N 13/0285* (2013.01); *H04N 13/0296* (2013.01); *G02B 27/0018* (2013.01); *H04N 13/0232* (2013.01)

(58) Field of Classification Search
None
See application file for complete search history.

(56) References Cited

U.S. PATENT DOCUMENTS 4,743,932 A * 5/1988 Matsui ............................ 396/92
4,980,716 A * 12/1990 Suzuki et al. .................. 396/104
(Continued)

FOREIGN PATENT DOCUMENTS

JP 2001-356260 A 12/2001
JP 2005-91865 A 4/2005
(Continued)

OTHER PUBLICATIONS

Extended European Search Report dated Jan. 12, 2015 issued in corresponding European Application No. 12827699.5.
(Continued)

*Primary Examiner* — Jay Patel
*Assistant Examiner* — Reza Aghevli
(74) *Attorney, Agent, or Firm* — Birch, Stewart, Kolasch & Birch, LLP

(57) ABSTRACT

An imaging device includes: an image acquisition unit configured to receive light fluxes passing through different regions in a single imaging optical system and acquire two images; a ghost detection unit configured to detect a ghost from the two acquired images; a first determination unit configured to determine whether the ghost is detected from any of the two acquired images; and a control unit configured to perform at least one of an automatic focus control, an automatic exposure control and an automatic white balance control based on an image for which it is not determined that the ghost is caused out of the two images in a case where the first determination unit determines that the ghost is detected from any of the two images.

17 Claims, 13 Drawing Sheets

(51) Int. Cl.
*H04N 5/232* (2006.01)
*H04N 13/00* (2006.01)
*G02B 7/28* (2006.01)
*H04N 5/369* (2011.01)
*G02B 27/00* (2006.01)

(56) References Cited

U.S. PATENT DOCUMENTS

| | | | |
|---|---|---|---|
| 5,532,755 A * | 7/1996 | Patel et al. | 348/614 |
| 7,755,703 B2 * | 7/2010 | Ogawa et al. | 348/614 |
| 2002/0003958 A1* | 1/2002 | Nagata | 396/106 |
| 2007/0200956 A1* | 8/2007 | Wales et al. | 348/614 |
| 2009/0115882 A1 | 5/2009 | Kawarada | |
| 2010/0013947 A1* | 1/2010 | Oikawa | 348/222.1 |
| 2010/0150538 A1 | 6/2010 | Ono et al. | |
| 2011/0234835 A1* | 9/2011 | Choi et al. | 348/222.1 |

FOREIGN PATENT DOCUMENTS

| | | |
|---|---|---|
| JP | 2008-54206 A | 3/2008 |
| JP | 2008-228181 A | 9/2008 |
| JP | 2008-242333 A | 10/2008 |
| JP | 2010-139942 A | 6/2010 |
| JP | 2011-205531 A | 10/2011 |

OTHER PUBLICATIONS

Japanese Office Action mailed Mar. 17, 2015 in related JP Application No. 2014-089339 with an English translation.
Official Communication issued Sep. 21, 2015 for corresponding European Patent Application No. 12827699.5.

* cited by examiner

FIG.4
NORMAL PIXEL
(A)
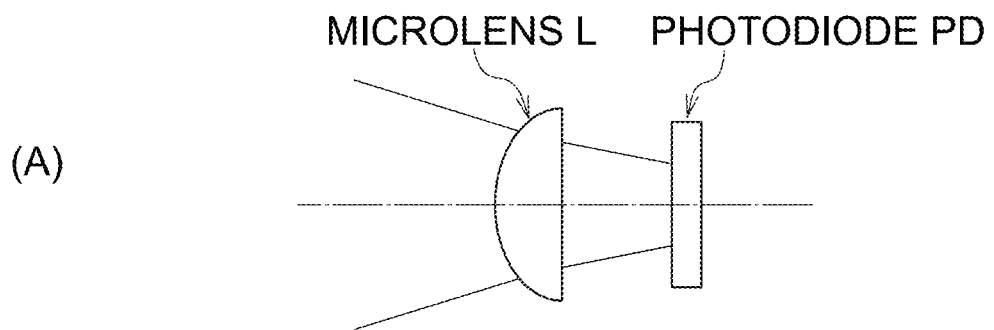
PHASE DIFFERENCE PIXEL
(B)
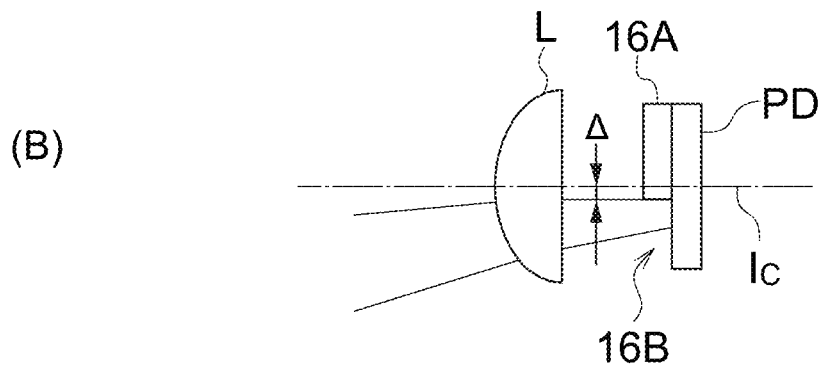

FIG.6
(A)
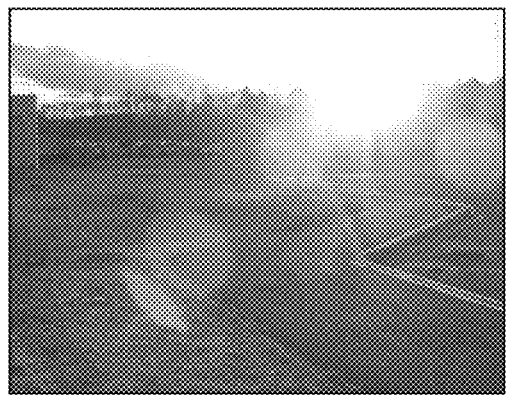
(B)
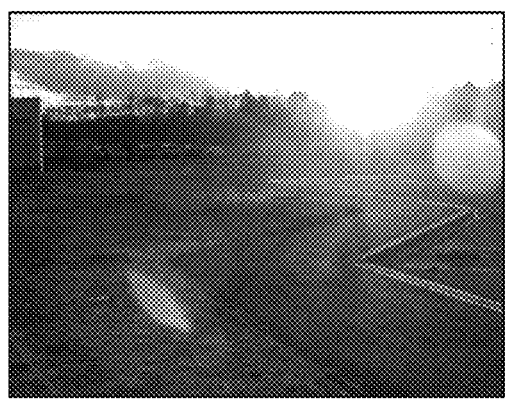
(C)
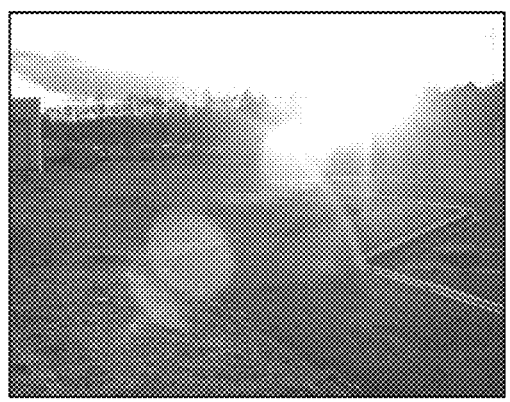

FIG.14
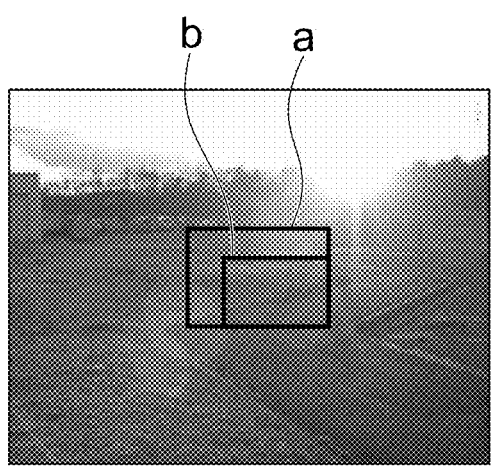
(A)
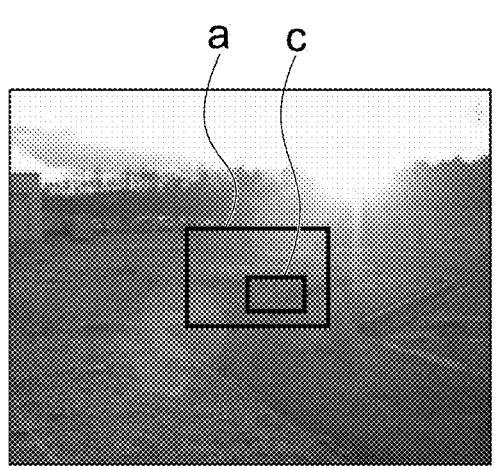
(B)

IMAGING DEVICE AND IMAGING METHOD

CROSS REFERENCE TO RELATED APPLICATIONS

This application is a Continuation of PCT International Application No. PCT/JP2012/065835 filed on Jun. 21, 2012, which claims priority under 35 U.S.0 119(a) to Application No. 2011-187561 filed in Japan on Aug. 30, 2011, all of which are hereby expressly incorporated by reference into the present application.

BACKGROUND OF THE INVENTION

1. Field of the Invention

The presently disclosed subject matter relates to an imaging device and an imaging method. Specifically, the presently disclosed subject matter relates to an imaging device and an imaging method that form object images which pass through different regions of a single imaging optical system on imaging elements and acquire an image for the left eye and an image for the right eye.

2. Description of the Related Art

In a case where a bright optical source such as the sun is included in an object, when the light of the optical source is reflected in an imaging optical system or on the surface of an imaging element and an image of the reflected light is formed on the imaging element, a ghost image may be caused in a taken image.

Japanese Patent Application Laid-Open No. 2008-228181 discloses a configuration in which imaging is performed twice by mutually different F values by changing the opening size of a diaphragm in an imaging optical system and ghost detection is performed from the difference between two images.

Japanese Patent Application Laid-Open No. 2008-054206 discloses a configuration in which imaging is performed in a focus position and a defocus position by moving a focus lens and ghost detection is performed from the difference between the focus image and the defocus image.

Japanese Patent Application Laid-Open No. 2005-091865 discloses a configuration in which an apparatus that acquires an image with an enlarged depth of field by performing image processing on a taken image has a mechanism to rotate a wavefront conversion element in a surface orthogonal to the optical axis of an optical system and ghost elimination is performed by performing addition/subtraction computation processing on two images acquired at the time of rotating the wavefront conversion element at rotation angles of 0 degrees and 180 degrees.

SUMMARY OF THE INVENTION

However, the inventions disclosed in Japanese Patent Application Laid-Open No. 2008-228181, Japanese Patent Application Laid-Open No. 2008-054206 and Japanese Patent Application Laid-Open No. 2005-091865 do not relate to a monocular stereoscopic imaging device that can take two images in imaging once. In a case where object images passing through different regions in the horizontal direction of an imaging lens are formed on imaging elements and a left-eye image and a right-eye image are acquired, there is a parallax between the left-eye image and the right-eye image. Therefore, when the inventions disclosed in Japanese Patent Application Laid-Open No. 2008-228181, Japanese Patent Application Laid-Open No. 2008-054206 and Japanese Patent Application Laid-Open No. 2005-091865 are applied to the monocular stereoscopic imaging device, a problem of false detection is caused.

Moreover, in the inventions disclosed Japanese Patent Application Laid-Open No. 2008-228181, Japanese Patent Application Laid-Open No. 2008-054206 and Japanese Patent Application Laid-Open No. 2005-091865, unless imaging is performed several times with different conditions, it is not possible to process a ghost image. Therefore, in the case of continuously taking images, for example, in the case of taking a live view image (through image) or taking a moving image, it is not possible to apply the inventions disclosed in Japanese Patent Application Laid-Open No. 2008-228181, Japanese Patent Application Laid-Open No. 2008-054206 and Japanese Patent Application Laid-Open No. 2005-091865.

Furthermore, in a case where images are continuously taken by a monocular stereoscopic imaging device that can continuously take two images in imaging once, when images subjected to the influence of ghost are used, there is a problem that it is not possible to perform accurate automatic focus control, automatic exposure control and automatic white balance control.

The presently disclosed subject matter is made taking into account such conditions and it is an object to provide an imaging device and an imaging method that can detect a ghost even in a case where images are continuously acquired, and accurately perform automatic focus control, automatic exposure control and automatic white balance even in a case where the ghost is caused.

To achieve this object, an imaging device according to one aspect of the presently disclosed subject matter includes: an image acquisition unit configured to receive light fluxes passing through different regions in a single imaging optical system and acquire two images; a ghost detection unit configured to detect a ghost from the two acquired images; a first determination unit configured to determine whether the ghost is detected from any of the two acquired images; and a control unit configured to perform at least one of an automatic focus control, an automatic exposure control and an automatic white balance control based on an image for which it is not determined that the ghost is caused out of the two images in a case where the first determination unit determines that the ghost is detected from any of the two images.

According to the imaging device according to one aspect of the presently disclosed subject matter, whether a ghost is caused in any of the two images is determined, and, in a case where the ghost is detected in any of the two images, automatic focus control, automatic exposure control and automatic white balance control are performed on the basis of an image for which it is not determined that the ghost is caused out of the two images. By this means, even in a case where images are continuously acquired, it is possible to detect a ghost. Moreover, even in a case where the ghost is caused, it is possible to accurately perform automatic focus control, automatic exposure control and automatic white balance control.

In the imaging device according to another aspect of the presently disclosed subject matter, the first determination unit may determine whether the ghost is detected in a region set in each of the two images. By this means, it is possible to reduce an image processing amount and shorten the time required for image processing. Here, the regions set in each of two images can be assumed as various ones such as an AF area, an AE area (photometric area) and an AWB area (light source kind discrimination area).

The imaging device according to another aspect of the presently disclosed subject matter further includes a second determination unit configured to determine whether a strength of the ghost caused in any of the two images is equal to or greater than a certain strength in a case where the first determination unit determines that the ghost is detected from any of the two images, in which the control unit may perform at least one of the automatic focus control, the automatic exposure control and the automatic white balance control on the basis of the two images in a case where the first determination unit determines that the ghost is detected from any of the two images and the second determination unit does not determine that the strength of the ghost caused in any of the two images is equal to or greater than the certain strength. By this means, in a case where the ghost caused in any of the two images is not equal to or greater than the certain level, since at least one of the automatic focus control, the automatic exposure control and the automatic white balance control is performed on the basis of the two images, it is possible to perform processing based on the two images in more cases and increase the accuracy of the processing.

The imaging device according to another aspect of the presently disclosed subject matter further includes a third determination unit configured to determine whether a ratio of a region in which a ghost is caused in any of the two images to the set region is equal to or greater than a certain ratio in a case where the first determination unit determines that the ghost is detected from any of the two images, in which the control unit may perform at least one of the automatic focus control, the automatic exposure control and the automatic white balance control based on the two images in a case where the first determination unit determines that the ghost is detected from any of the two images and the third determination unit does not determine that the ratio of the region in which the ghost is caused in any of the two images to the set region is equal to or greater than the certain ratio. By this means, in a case where the ratio of the region in which the ghost is caused in any of two images to the set region is not equal to or greater than the certain ratio, since at least one of the automatic focus control, the automatic exposure control and the automatic white balance control is performed on the basis of the two images, it is possible to perform processing based on the two images in more cases and increase the accuracy of the processing.

The imaging device according to another aspect of the presently disclosed subject matter further includes a fourth determination unit configured to detect a region in which the ghost is not caused in both of the two images in a case where the first determination unit determines that the ghost is detected from any of the two images, and determine whether a ratio of the detected region to the set region is equal to or greater than a certain ratio, in which the control unit may perform at least one of the automatic focus control, the automatic exposure control and the automatic white balance control based on an image for which it is not determined that the ghost is caused out of the two images in a case where the first determination unit determines that the ghost is detected from any of the two images and the fourth determination unit does not determine that the ratio of the region in which the ghost is not caused in both of the two images to the set region is equal to or greater than the certain ratio, and the control unit may perform at least one of the automatic focus control, the automatic exposure control and the automatic white balance control based on the region in which the ghost is not caused in both of the two images in a case where the first determination unit determines that the ghost is detected from any of the two images and the fourth determination unit determines that the ratio of the region in which the ghost is not caused in both of the two images to the set region is equal to or greater than the certain ratio. That is, in a case where the ratio of the region in which the ghost is not caused in any of the two images to the set region is not equal to or greater than the certain ratio, at least one of the automatic focus control, the automatic exposure control and the automatic white balance control is performed on the basis of the image for which it is not determined that the ghost is caused out of the two images. Moreover, in a case where the ratio of the region in which the ghost is not caused in any of the two images to the set region is equal to or greater than the certain ratio, at least one of the automatic focus control, the automatic exposure control and the automatic white balance control is performed on the basis of the region in which the ghost is not caused in both of the two images out of the two images. By this means, it is possible to perform processing based on the two images in many cases and increase the accuracy of the processing. Especially, in the case of AF processing, it is possible to perform phase difference AF processing with a shorter processing time in more cases.

In the imaging device according to another aspect of the presently disclosed subject matter, the ghost detection unit may detect the ghost by calculating an image shift amount due to a parallax of an object image between the two acquired images, correcting an image shift between the two images based on the calculated image shift amount and calculating a difference in a pixel value between corresponding pixels of the two images after the image shift is corrected. By this means, it is possible to accurately detect the occurrence of the ghost.

In the imaging device according to another aspect of the presently disclosed subject matter, the ghost detection unit may detect the ghost by applying a low-pass filter to each of the two images and calculating a difference between the two images to which the low-pass filter is applied. By this means, it is possible to detect the occurrence of the ghost in a short time.

In the imaging device according to another aspect of the presently disclosed subject matter, in a case where the first determination unit does not determine that the ghost is detected from the two images, at least one of the automatic focus control, the automatic exposure control and the automatic white balance control may be performed based on the two images. By this means, it is possible to perform more accurate control.

In the imaging device according to another aspect of the presently disclosed subject matter, in a case where the control unit performs the automatic focus control based on an image for which it is not determined that the ghost is caused out of the two images, the control unit may perform the automatic focus control based on an evaluation value indicating an in-focus state, and in a case where the automatic focus control is performed based on the two images, the control unit may perform the automatic focus control based on a phase difference between the two images. By this means, in a case where the ghost is not caused, it is possible to perform AF processing in a short time.

The imaging device according to another aspect of the presently disclosed subject matter further includes a fifth determination unit configured to determine whether a brightness of an object is equal to or greater than a certain brightness, in which the ghost detection unit may detect the ghost only in a case where the fifth determination unit determines that the brightness of the object is equal to or greater than the certain brightness. By this means, since the ghost is detected only in a case where there is a possibility that the ghost is caused, it is possible to shorten the operation time.

An imaging method according to another aspect of the presently disclosed subject matter may include: a step of receiving light fluxes passing through different regions in a single imaging optical system and acquiring two images; a step of detecting a ghost from the two acquired images; a step of determining whether the ghost is detected from any of the two acquired images; and a step of performing at least one of an automatic focus control, an automatic exposure control and an automatic white balance control based on an image for which it is not determined that the ghost is caused out of the two images in a case where it is determined that the ghost is detected from any of the two images.

A program according to another aspect of the presently disclosed subject matter may cause a computation device to execute: a step of receiving light fluxes passing through different regions in a single imaging optical system and acquiring two images; a step of detecting a ghost from the two acquired images; a step of determining whether the ghost is detected from any of the two acquired images; and a step of performing at least one of an automatic focus control, an automatic exposure control and an automatic white balance control based on an image for which it is not determined that the ghost is caused out of the two images in a case where it is determined that the ghost is detected from any of the two images. Moreover, a computer-readable non-temporary recording medium that records the program is included in the presently disclosed subject matter.

According to the presently disclosed subject matter, it is possible to detect a ghost even in a case where images are continuously taken, and it is possible to accurately perform automatic focus control, automatic exposure control and automatic white balance control even in a case where the ghost is caused.

BRIEF DESCRIPTION OF THE DRAWINGS

FIG. 4 is an enlarged main component view of FIG. 3;
In FIG. 6, portion (A) is a schematic diagram illustrating a state where main pixel data and pixel data are overlapped and displayed, portion (B) illustrates the main pixel data and portion (C) illustrates the sub-pixel data.

DETAILED DESCRIPTION OF EXEMPLARY EMBODIMENTS

In the following, the exemplary mode to implement an imaging device according to the presently disclosed subject matter is described in detail according to the accompanying drawings.

First Embodiment

Figure 1:
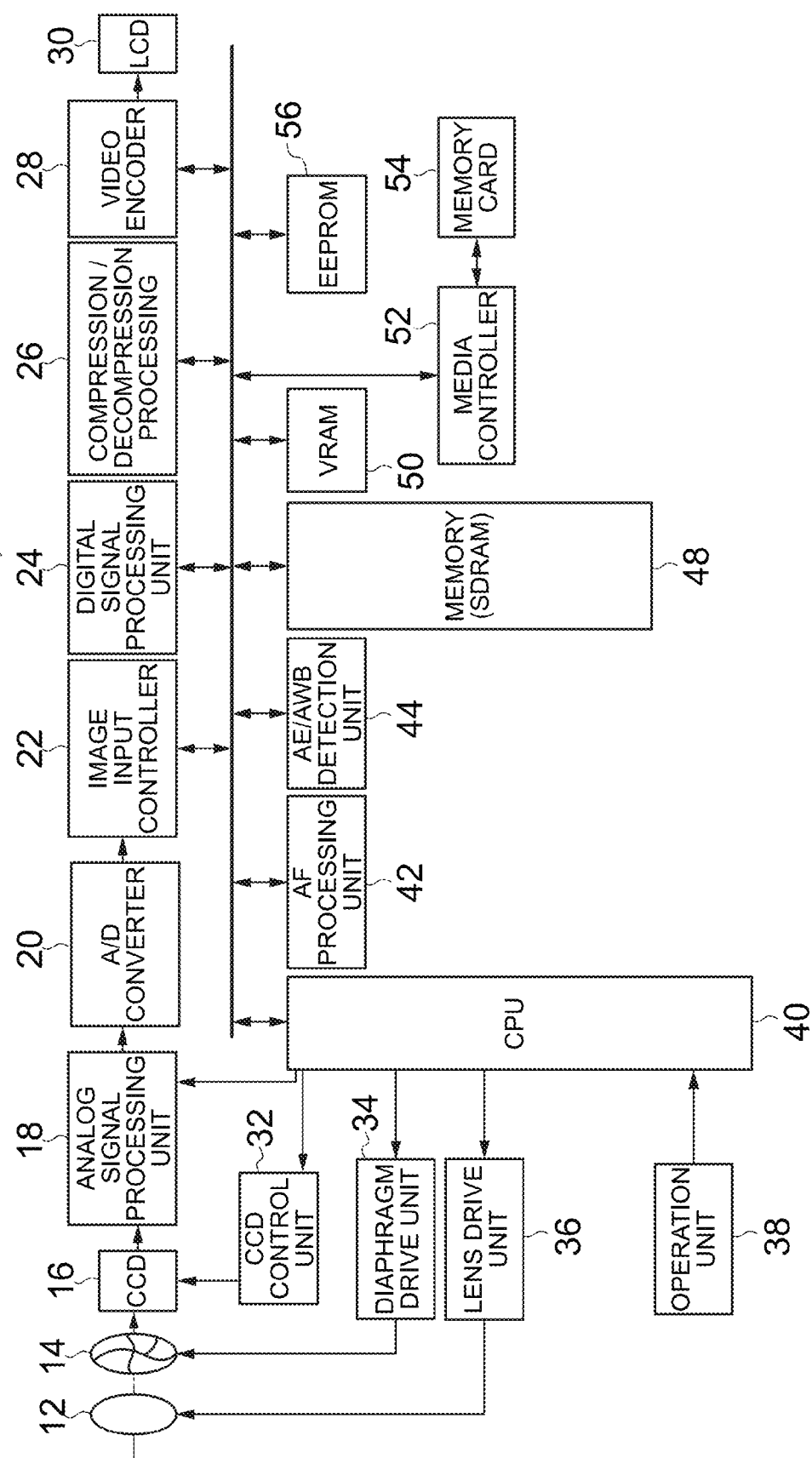
FIG. 1 is a block diagram of a stereoscopic imaging device.

[Description of Configurations of Imaging Device]
FIG. 1 is a block diagram illustrating an embodiment of a monocular stereoscopic imaging device 10 according to the presently disclosed subject matter. This monocular stereoscopic imaging device 10 denotes a digital camera that receives light passing through a lens by an imaging element, converts it into a digital signal and records it in a storage medium, and the operation of the entire device is integrally controlled by a central processing unit (CPU) 40.

The stereoscopic imaging device 10 includes an operation unit 38 such as a shutter button, a mode dial, a playback button, a MENU/OK key, a cross key and a BACK key. A signal from this operation unit 38 is input in the CPU 40, and the CPU 40 controls circuits of the stereoscopic imaging device 10 on the basis of the input signal, for example, performs lens drive control, diaphragm drive control, imaging operation control, image processing control, recording/reproduction control of image data or display control of a liquid crystal monitor 30 for stereoscopic display, and so on.

The shutter button denotes an operation button that inputs an imaging start instruction, and is formed with switches of a two-step stroke type including an S1 switch that is turned on at the time of half press and an S2 switch that is turned on at the time of full press. The mode dial denotes selection means for selecting a 2D imaging mode, a 3D imaging mode, an automatic imaging mode, a manual imaging mode, a scene position such as a person, a scenery and a night view, a macro mode, an animation mode or a parallax priority imaging mode according to the presently disclosed subject matter.

The playback button denotes a button to switch to a playback mode that displays a still image or moving image of a stereoscopic image (3D image) or plane image (2D image) that is imaged and recorded, on the liquid crystal monitor 30. The MENU/OK key denotes an operation key that has both a function as a menu button that gives an instruction to display a menu on the screen of the liquid crystal monitor 30 and a function as an OK button that instructs decision and execution of a selected content. The cross key denotes an operation unit that inputs an instruction of four directions of the left, right, top and bottom, and functions as a button (cursor movement operation means) that selects an item from the menu screen and instructs selection of various setting items from each menu. Moreover, the top/bottom key of the cross key functions as a zoom switch at the time of imaging or a playback zoom switch at the time of the playback mode, and the left/right key functions as a frame advance button (forward-direction/reverse-direction advance) at the time of the playback mode. The BACK key is used when a desired target such as a selection item is removed, an instruction content is cancelled or it returns to the immediately previous operation state.

At the time of the imaging mode, image light indicating an object is formed on a light receiving surface of a phase difference CCD 16 that is a solid-imaging element, through a diaphragm 14 and an imaging optical system 12 including a focus lens and a zoom lens.

The imaging optical system 12 is driven by a lens drive unit 36 controlled by the CPU 40, and performs focus control and zoom control, and so on.

The diaphragm 14 is formed with, for example, five diaphragm blades, driven by a diaphragm drive unit 34 controlled by the CPU 40, and for example, subjected to diaphragm control in six stages at intervals of 1 AV from a diaphragm value of F1.4 to a diaphragm value of F11. Moreover, the CPU 40 performs reading control of the charge accumulation time (shutter speed) in the phase difference CCD 16 and a video signal from the phase difference CCD 16 through a CCD control unit 32.

Figure 2:
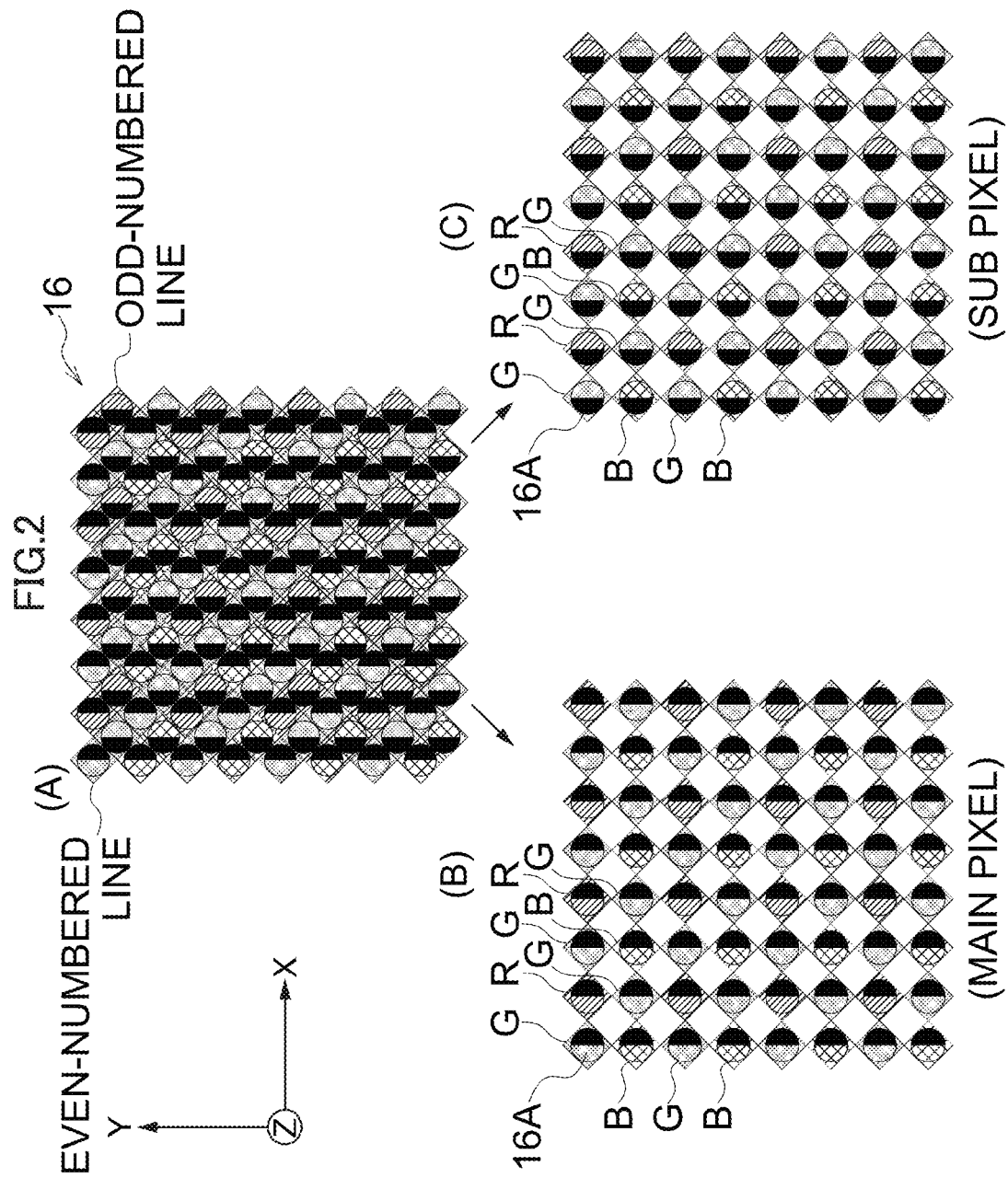
FIG. 2 is a view illustrating a configuration example of a phase difference image sensor.

FIG. 2 is a view illustrating a configuration example of the phase difference CCD 16 (monocular stereoscopic imaging element).

The phase difference CCD 16 has pixels (main pixels) of odd-numbered lines arranged in a matrix manner and pixels (sub-pixels) of even-numbered lines, and image signals of two regions subjected to photoelectric conversion in these main pixels and sub-pixels can be read independently.

As illustrated in FIG. 2, in the odd-numbered lines (1, 3, 5 . . . ) of the phase difference CCD 16, a line of pixel array of GRGR . . . and a line of pixel array of BGBG . . . are alternately provided among pixels having color filters of R (red), G (green) and B (blue). On the other hand, in the even-numbered lines (2, 4, 6 . . . ), similarly to the odd-numbered lines, a line of pixel array of GRGR . . . and a line of pixel array of BGBG . . . are alternately provided, and as for the pixels of the even-numbered lines, the pixels are arranged while being mutually shifted by ½ pitches in the line direction.

Figure 3:
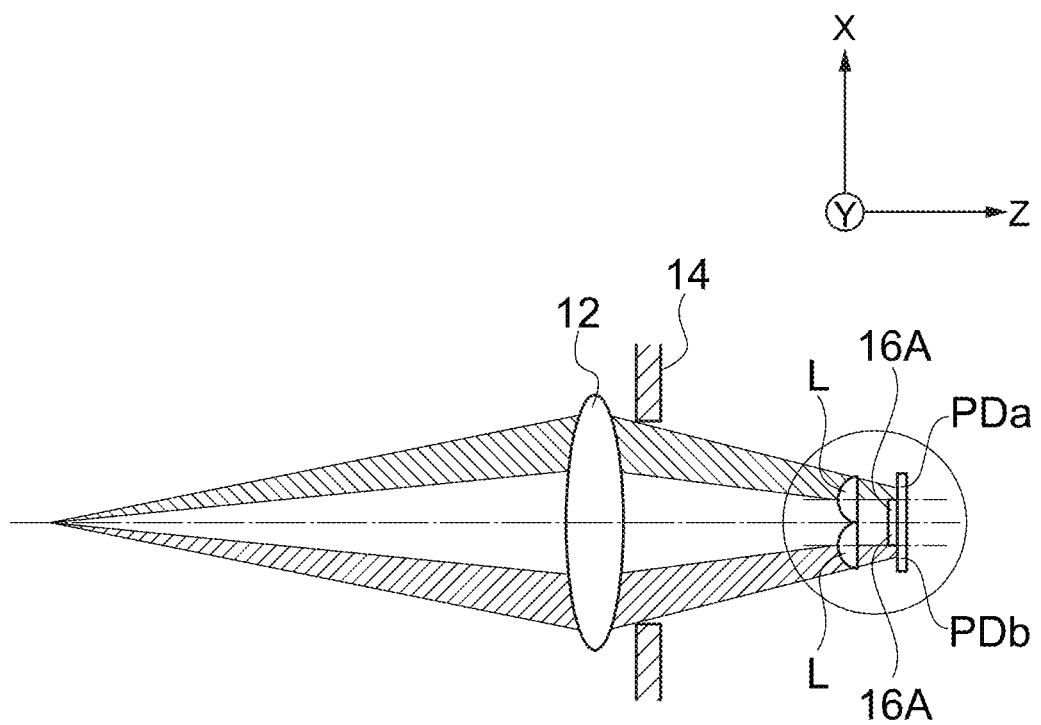
FIG. 3 is a view illustrating each pixel of a main pixel and sub-pixel.

FIG. 3 is a view illustrating the imaging optical system 12, the diaphragm 14 and each pixel of main pixel PDa and sub-pixel PDb of the phase difference CCD 16, and FIG. 4 is an enlarged main component view of FIG. 3.

As illustrated in portion (A) of FIG. 4, a light flux that passes through an exit pupil enters a normal CCD pixel (photodiode PD) without restriction through microlens L.

By contrast with this, a light shielding member 16A is formed on main pixel PDa and sub-pixel PDb of the phase difference CCD 16, and the right half or left half of the light receiving surfaces of main pixel PDa and sub-pixel PDb is shielded by this light shielding member 16A. That is, the light shielding member 16A has a function as a pupil division member.

Here, although the phase difference CCD 16 having the above-mentioned configuration is formed such that a region (right half or left half) in which the light flux is restricted by the light shielding member 16A is different between main pixel PDa and sub-pixel PDb, it is not limited to this. Instead of providing the light shielding member 16A, microlens L and photodiode PD (PDa or PDb) may be relatively shifted in the horizontal direction and a light flux that enters photodiode PD may be restricted by the shift direction. Moreover, by providing one microlens for two pixels (main pixel and sub-pixel), the light flux that enters each pixel may be restricted.

Returning back to FIG. 1, the signal charge accumulated in the phase difference CCD 16 is read out as a voltage signal corresponding to a signal charge on the basis of a read signal applied from the CCD control unit 32. The voltage signal read from the phase difference CCD 16 is added to an analog signal processing unit 18, and the R, G and B signals of each pixel are subjected to sampling hold, amplified by the gain (corresponding to ISO sensibility) designated from the CPU 40 and thereafter added to an A/D converter 20. The A/D converter 20 converts the sequentially input R, G and B signals into digital R, G and B signals and outputs these to an image input controller 22.

A digital signal processing unit 24 performs predetermined signal processing such as offset processing, white balance correction, gain control processing including sensitivity correction, gamma correction processing, synchronization processing, YC processing and sharpness correction on the digital image signal input through the image input controller 22.

Moreover, an EEPROM 56 denotes a nonvolatile memory that stores a camera control program, defect information of the phase difference CCD 16, various parameters and tables used for image processing or the like, a program diagram, a plurality of parallax priority program diagrams according to the presently disclosed subject matter, and so on.

Here, as illustrated in portions (B) and (C) of FIG. 2, main image data read out from the main pixels of the odd-numbered lines of the phase difference CCD 16 is processed as left viewpoint image data and sub-image data read out from the sub-pixels of the even-numbered lines is processed as right viewpoint image data.

The left viewpoint image data and the right viewpoint image data (3D image data) processed in the digital signal processing unit 24 are input in a VRAM 50. The VRAM 50 includes regions A and B that store 3D image data indicating a 3D image of one frame. The 3D image data indicating the 3D image of one frame in the VRAM 50 is alternately rewritten in regions A and B. The written 3D image data is read out from a region different from a region in which the 3D image data is rewritten, among regions A and B of the VRAM 50. The 3D image data read out from the VRAM 50 is encoded in a video encoder 28, output to the liquid crystal monitor 30 (LCD) for stereoscopic display installed on the back of the camera, and thereby a 3D object image is displayed on the display screen of the liquid crystal monitor 30.

Although this liquid crystal monitor 30 denotes stereoscopic display means for being able to display the stereoscopic image (left viewpoint image and right viewpoint image) as directivity images having respective predetermined directivities by a parallax barrier, it is not limited to this, and it may be one that can individually display the left viewpoint image and the right viewpoint image by using a lenticular lens or wearing special glasses such as polarized glasses and liquid crystal shutter glasses.

Moreover, when the first-stage press (half press) of the shutter button of the operation unit 38 is performed, and the phase difference CCD 16 starts AF operation and AE operation and performs control such that the focus lens in the imaging optical system 12 is set to the focusing position through the lens drive unit 36. Moreover, image data output from the A/D converter 20 at the time of half press of the shutter button is imported in an AE/AWB detection unit 44.

The AE/AWB detection unit 44 integrates G signals in the whole screen or integrates G signals differently weighted between a center screen part and a peripheral part, and outputs the integration value to the CPU 40. The CPU 40 calculates the brightness (imaging EV value) of the object from the integration value input from the AE/AWB detection unit 44, decides a diaphragm value of the diaphragm 14 and an electronic shutter (shutter speed) of the phase difference CCD 16 according to a predetermined program diagram on the basis of this imaging EV value, controls the diaphragm 14 by means of the diaphragm drive unit 34 on the basis of the decided diaphragm value and controls the charge accumulation time in the phase difference CCD 16 by means of the CCD control unit 32 on the basis of the decided shutter speed (AE processing).

Moreover, the AE/AWB detection unit 44 divides one screen into a plurality of areas (for example, 16×16) as a physical quantity required for AWB control and calculates the average integration value of each color of R, G and B image signals in each divided area. The CPU 40 calculates a ratio of R/G and a ratio of B/G every divided area from the acquired R integration value, B integration value and G integration value, and performs light source type determination on the basis of distribution of the calculated values of R/G and B/G in the color spaces of R/G and B/G. Furthermore, according to the white balance adjustment value suitable for the determined light source type, for example, the gain values (white balance correction value) with respect to the R, G and B signals in a white balance adjustment circuit are decided such that the value of each ratio becomes about one (that is, the integration ratio of RGB in one screen becomes R:G:B=1:1:1) (AWB processing).

An AF processing unit 42 denotes a part that performs contrast AF processing or phase AF processing. In the case of performing the contrast AF processing, the high frequency component of image data in a predetermined focus region (hereinafter referred to as an "AF area") is extracted from at least one image data of the left viewpoint image data and the right viewpoint image data, this high frequency component is integrated, and whereby the AF evaluation value indicating the focusing state is calculated. The AF control is performed by controlling the focus lens in the imaging optical system 12 such that this AF evaluation value becomes maximum. Here, the AF evaluation value may be calculated using the G signal or other image signals such as a luminance signal (Y signal). Moreover, in the case of performing the phase difference AF processing, the phase difference of image data corresponding to the main pixel and the sub-pixel in a predetermined AF area in the left viewpoint image data and the right viewpoint image data is detected, and the defocus amount is calculated on the basis of information showing this phase difference. The AF control is performed by controlling the focus lens in the imaging optical system 12 such that this defocus amount becomes 0. Although the AF area is set to the center part on the screen, the entire screen may be set as the AF area or a region near a desired object (for example, face) may be set as the AF area. Here, a method of detecting the face has already been known, and therefore its explanation is omitted.

When the AE operation and the AF operation are finished and the second-stage press (full press) of the shutter button is performed, image data for two images of the left-eye image (main image) and the right-eye image (sub-image) corresponding to the main pixel and the sub-pixel output from the A/D converter 20 in response to that press is input from the image input controller 22 to a memory (SDRAM) 48 and temporarily stored.

The image data for the two images temporarily stored in the memory 48 is arbitrarily read out by the digital signal processing unit 24, and predetermined signal processing including generation processing of luminance data and color difference data of the image data (YC processing) is performed here. The image data subjected to YC processing (YC data) is stored in the memory 48 again. Subsequently, YC data for the two images is output to a compression/decompression processing unit 26, subjected to predetermined compression processing such as JPEG (joint photographic experts group), and thereafter stored in the memory 48 again.

A multipicture file (MP file: a file in a format in which a plurality of images are coupled) is generated from the YC data for the two images (compression data) stored in the memory 48, and the PM file is read out by a media controller 52 and recorded in a memory card 54.

Here, the AF operation is performed not only in a case where the first-stage press (half press) of the shutter button is performed but also in a case where image data for two images of the left-eye image and the right-eye image, that is, right-eye image data and left-eye image data are continuously imaged. As the case where the right-eye image data and the left-eye image data are continuously imaged, for example, there is a case where a live view image (through image) is taken or a moving image is taken. In this case, while continuously imaging the right-eye image data and the left-eye image data, the AF processing unit 42 performs continuous AF that continuously controls the focus lens position by constantly calculating the AF evaluation value repeatedly or detecting the phase difference.

(Explanation of Operation of Imaging Device)

Next, the operation of the monocular stereoscopic imaging device 10 is described. This imaging processing is controlled by the CPU 40. A program to cause the CPU 40 to execute this imaging processing is stored in the EEPROM 56 or a program storage unit in the CPU 40.

Object light passing through the imaging optical system 12 is formed on the light receiving surface of the phase difference CCD 16 through the diaphragm 14. Signal charges accumulated in the main pixel and sub-pixel of the phase difference CCD 16 are sequentially read out by the CCD control unit 32 at a predetermined frame rate as voltage signals (image signals) corresponding to the signal charges and sequentially input in the digital signal processing unit 24 through the analog signal processing unit 18, the A/D converter 20 and the image input controller 22, and the left-eye image data and the right-eye image data are sequentially generated. The generated left-eye image data and right-eye image data are sequentially input in the VRAM 50.

The CPU 40 changes the opening amount of the diaphragm 14 (F value) by means of the diaphragm drive unit 34 on the basis of the left-eye image data and the right-eye image data. Moreover, the CPU 40 performs zooming according to the input from the operation unit 38 by the means of the lens drive unit 36.

The photographer can check an imaging angle of view by seeing an image (through image) displayed in real time on this liquid crystal monitor 30.

When the shutter button is pressed halfway, an S1ON signal is input in the CPU 40 and the CPU 40 implements AE/AF operation by means of the AF processing unit 42 and the AE/AWB detection unit 44.

Figure 5:
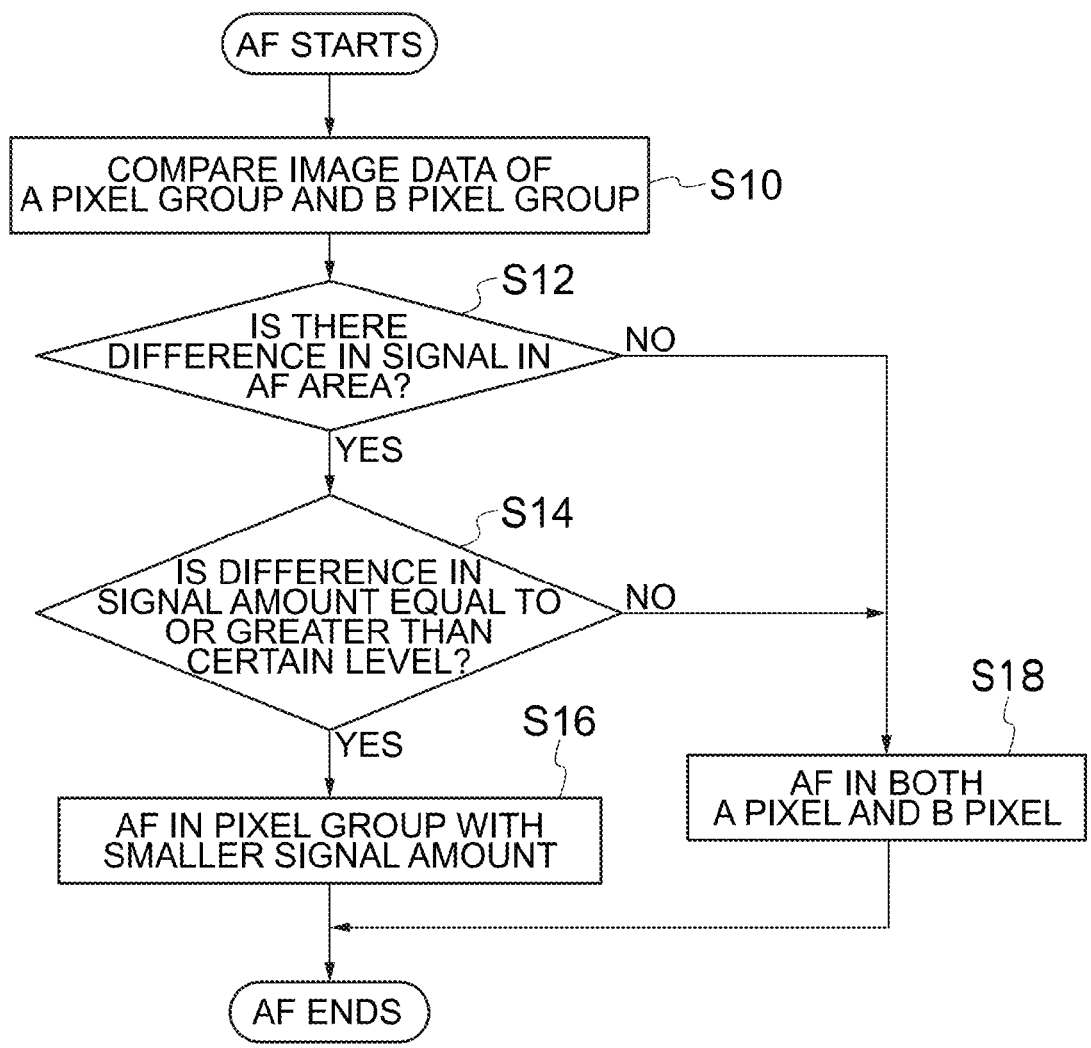
FIG. 5 is a flowchart illustrating a flow of one example of AF processing in a first embodiment.

A feature of the present embodiment lies in ghost detection from the left-eye image data and the right-eye image data and the AF processing in a case where the ghost is caused. FIG. 5 is a flowchart illustrating the flow of the AF processing in the monocular stereoscopic imaging device 10.

To detect the ghost, the CPU 40 compares the left-eye image data and the right-eye image data acquired immediately before an S1ON signal is input in the CPU 40 (step S10).

Portion (A) of FIG. 6 schematically illustrates a state where the main pixel data and the sub-pixel data (left-eye image data and right-eye image data) with respective ghost images are overlapped with each other and displayed on the liquid crystal monitor 30. Since stereoscopic display cannot be performed in the figure, it is shown as a plane image. Portion (B) of FIG. 6 illustrates the main pixel data with a ghost image and portion (C) of FIG. 6 illustrates the sub-pixel data with a ghost image.

Figure 7:
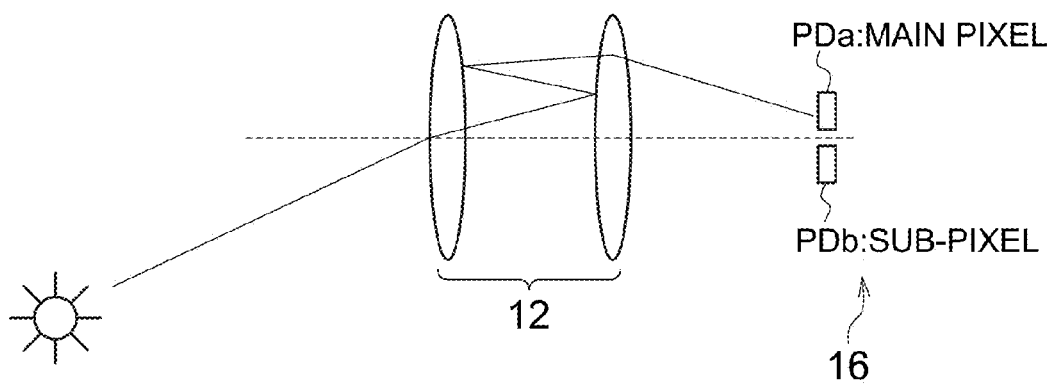
FIG. 7 is a schematic diagram illustrating incidence of extraordinary light in a monocular stereoscopic imaging device.

Because of a structure for pupil division in the stereoscopic imaging device 10, as illustrated in FIG. 7, extraordinary light that enters main pixel PDa does not enter sub-pixel PDb and extraordinary light that enters sub-pixel PDb does not enter main pixel PDa in most cases. That is, the ghost image that appears in the main pixel data in portion (B) of FIG. 6 hardly appears in the sub-pixel data in portion (C) of FIG. 6, and the ghost image that appears in the sub-pixel data in portion (C) of FIG. 6 hardly appears in the main pixel data in portion (B) of FIG. 6. Thus, in the stereoscopic imaging device 10, it is possible to detect the ghost by comparing the main pixel data and the sub-pixel data.

Figure 8:
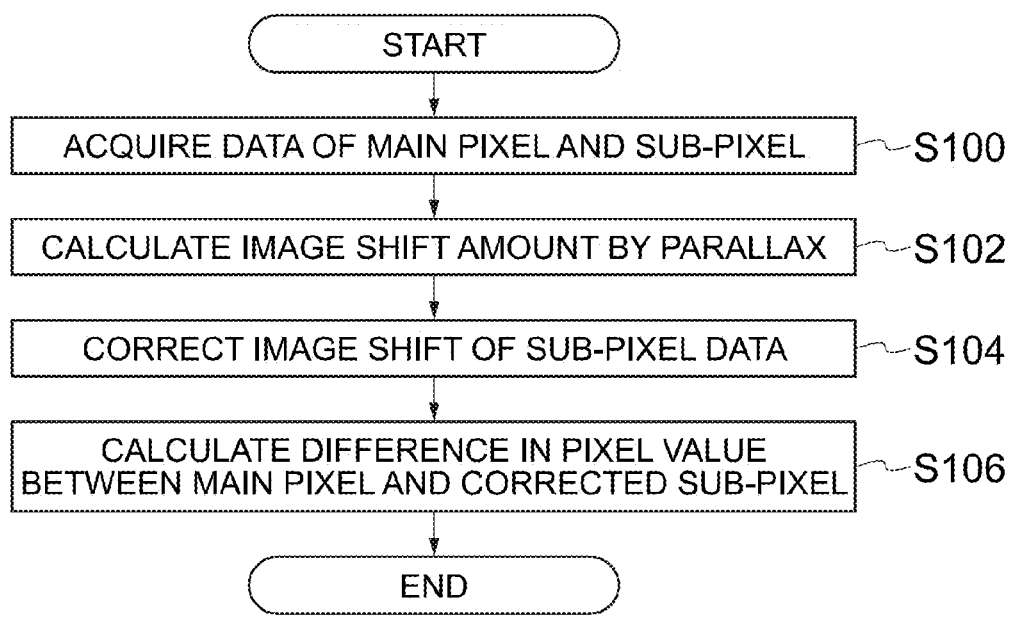
FIG. 8 is a flowchart illustrating a flow of one example of ghost detection processing.

The processing in step S10 is described using FIG. 8. The CPU 40 acquires the main pixel data and the sub-pixel data, that is, the left-eye image data and the right-eye image data from the VRAM 50 (step S100). Although the main pixel data is the right-eye image data and the sub-pixel data is the left-eye image data in the present embodiment, it is not limited to this.

Figure 9:
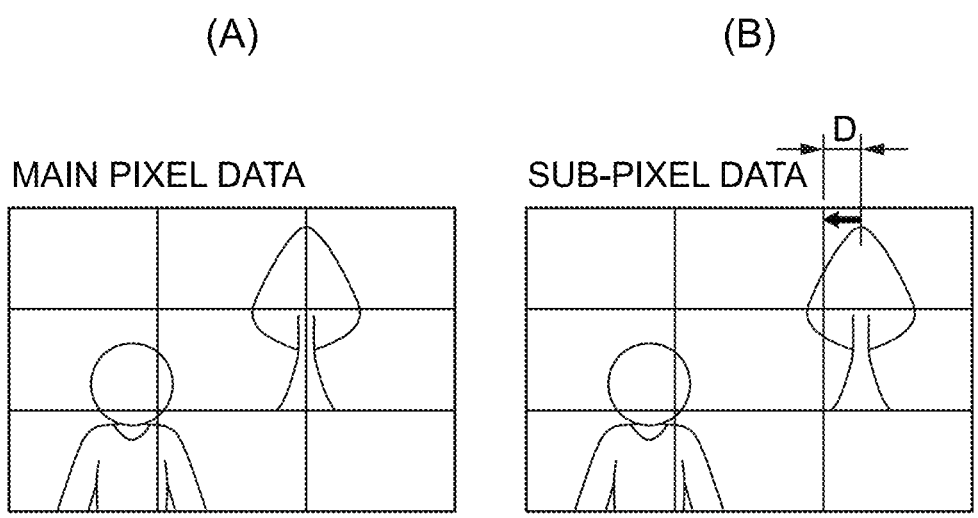
In FIG. 9, portions (A) and (B) are explanatory drawings used to describe an image shift by parallax and image shift correction.

The CPU 40 calculates an image shift amount by parallax (which may be referred to as a "parallax amount" below) (step S102). To be more specific, first, the correspondence relationships between the main pixels in the main pixel data and the sub-pixels in the sub-pixel data are detected (corresponding point detection), next, the image shift amount (the difference between the coordinates of the main pixel in the main pixel data and the coordinates of the sub-pixel in the sub-pixel data) between corresponding pixels (between corresponding points) is calculated, and a parallax map showing the relationship between each pixel (main pixel and/or sub-pixel) and the image shift amount (parallax distribution) is generated. Here, the parallax map of this example shows the correspondence relationship between each sub-pixel in the sub-pixel data and the image shift amount. For example, since an image shift is caused in a tree image by D between the main pixel data illustrated in portion (A) of FIG. 9 and the sub-pixel data illustrated in portion (B) of FIG. 9, each pixel forming the tree image is associated with image shift amount D. Here, although an image shift is hardly caused in the person image in portions (A) and (B) of FIG. 9, a small image shift corresponding to the object distance is actually caused in the person image.

The CPU 40 corrects an image shift due to the parallax of the object image between the main pixel data and the sub-pixel data on the basis of the parallax map. In this example, by moving a sub-pixel in the sub-pixel data, the coordinates of a main pixel in the main pixel data and the coordinates of the sub-pixel in a sub-pixel data corresponding to the main pixel are matched (step S104). For example, in the sub-pixel data illustrated in portion (B) of FIG. 9, the tree image is moved only by D in the left direction.

The CPU 40 calculates the difference of the pixel value (signal amount) between the main pixel and the sub-pixel after the image shift has been corrected in this way (step S106). In the present embodiment, the difference of the pixel value in the AF area set with respect to each of the main pixel and the sub-pixel after the image shift has been corrected is calculated. By this means, the main pixel data and the sub-pixel data are compared.

The CPU 40 determines whether there is a difference in the signal amount in the AF area, that is, whether the difference calculated in step S106 is not 0 (step S12). In a case where a ghost is caused in the AF area of either of the main pixel data or the sub-pixel data, the difference of the signal amount does not become 0. In the present embodiment, the value (ghost pixel value) of a region in which a ghost image exists in the main pixel data becomes positive, and the value (ghost pixel value) of a region in which a ghost image exists in the sub-pixel data becomes negative. For example, the main pixel data illustrated in portion (B) of FIG. 6 and the sub-pixel data illustrated in portion (C) of FIG. 6 are acquired, and in a case where the AF area is set to the central part of the screen, since the ghost appears in the sub-pixel data in portion (C) of FIG. 6, the difference in the signal amount does not become 0.

In a case where it is determined in step S12 that there is a difference in the signal amount ("Yes" in step S12), the CPU 40 determines whether the difference is equal to or greater than a certain level (step S14). A case where the difference is equal or greater than the certain level denotes a case where it seems that the ghost has strong strength and an influence on AF.

In a case where it is determined in step S14 that the difference is equal to or greater than the certain level, ("Yes" in step S14), the CPU 40 determines an image with a smaller signal amount in the AF area as a target image and inputs it in the AF processing unit 42. The AF processing unit 42 performs contrast AF processing on the basis of the image data in the AF area of the AF target image (step S16). Since the signal amount becomes large in an image in which a ghost is caused, as for the image with a small signal amount, a case is considered where the ghost is not caused or, even if the ghost is caused, its influence is small. In the present embodiment, this image with a small signal amount is defined as an image in which the ghost is not caused. Therefore, it is possible to reduce the risk of false focusing by performing AF using an image with a small signal amount in the AF area.

In a case where it is determined in step S12 that there is no difference in the signal amount ("No" in step S12) or where it is determined in step S12 that there is a difference in the signal amount ("Yes" in step S12) and it is determined in step S14 that the difference is not equal to or greater than the certain level ("No" in step S14), since a case is assumed where the ghost is not caused, or even if the ghost is caused, it is a weak ghost that has no influence on AF (in the presently disclosed subject matter, these two cases are defined as a case where the ghost is not caused), the AF processing unit 42 performs phase difference AF processing on the basis of signals in the AF area of two images (step S18).

Afterwards, when the shutter button is fully pressed, an S2ON signal is input in the CPU 40 and the CPU 40 starts imaging and recording processing. That is, the phase difference CCD 16 is exposed at a shutter speed and a diaphragm value decided on the basis of the photometric result.

The image data for two images output from the main pixel and the sub-pixel of the phase difference CCD 16 is imported in the VRAM 50 through an analog processing unit 60, the A/D converter 20 and the image input controller 22, converted into a luminance/color-difference signal in an image signal processing unit 64, and thereafter stored in the VRAM 50. The left-eye image data stored in the VRAM 50 is added to the compression/decompression processing unit 26, compressed according to a predetermined compression format (for example, JPEG format), and thereafter stored in the VRAM 50.

An MP file is generated from the compressed data for the two images stored in the VRAM 50, and the MP file is recorded in the memory card 54 by means of a media controller 52. By this means, a stereoscopic image is imaged and recorded.

Also, in the present embodiment, although an example case has been described where a stereoscopic image is taken, the monocular stereoscopic imaging device 10 can take both a plane image and a stereoscopic image. In the case of taking a plane image, the imaging may be performed using only the main pixel or the sub-pixel of the phase difference CCD 16. Since details of imaging processing are similar to the case of imaging a stereoscopic image, the explanation is omitted.

The image recorded in the memory card 54 as described above can be played and displayed on the liquid crystal monitor 30 by setting the mode of the monocular stereoscopic imaging device 10 to a playback mode by the playback button.

When it is set to the playback mode, the CPU 40 outputs a command to the media controller 52 to read an image file that was recorded in the memory card 54 last.

Compressed image data of the read image file is added to the compression/decompression processing unit 26, decompressed to a non-compression luminance/color-difference signal, and thereafter output to the liquid crystal monitor 30 through the video encoder 28.

The frame advance of images is performed by operation of the right and left keys of the cross key, and when the right key of the cross key is pressed, the next image file is read out from the memory card 54 and played and displayed on the liquid crystal monitor 30. Moreover, when the left key of the cross key is pressed, the previous image file is read out from the memory card 54 and played and displayed on the liquid crystal monitor 30.

According to the present embodiment, it is possible to detect a ghost even if images are continuously acquired, and it is possible to accurately perform the AF processing even in a case where the ghost is caused. Although the phase difference AF processing is likely to cause false focusing in a case where there is a difference in the signal amounts of two images to be used, it is possible to avoid the false focusing by applying the contrast AF processing using images without a ghost.

Also, in the present embodiment, in a case where it is determined in step S12 that there is no difference in the signal amount ("No" in step S12) or in a case where it is determined in step S12 that there is a difference in the signal amount ("Yes" in step S12) and it is determined in step S14 that the difference is not equal to or greater than the certain level ("No" in step S14), although the phase difference AF processing is performed on the basis of signals in the AF area of the two images (step S18), the AF processing may be performed by performing the contrast AF processing on the two images on the basis of the signals in the AF area. In a case where the object is dark or the like, there is a possibility that noise is large and false focusing is caused. Therefore, in a case where the brightness of the object is detected and the object is dark, it is possible to avoid the false focusing by processing the contrast AF processing. Here, although a case is assumed where the results of performing the contrast AF processing on the two images may be different, in this case, focusing may be performed for the one with a closer object distance in the calculated results, focusing processing may be performed on the basis of an earlier detected result or the focusing position may be decided by combining the two results.

Moreover, in the present embodiment, although a ghost is detected from the left-eye image data and the right-eye image data and the AF processing is changed according thereto, what is changed according to the existence/nonexistence of the occurrence of the ghost is not limited to the AF processing. The AE processing may be changed or the AWB processing may be changed according to the existence/nonexistence of the occurrence of the ghost.

First, the difference in the signal amount between the left-eye image data and the right-eye image data acquired immediately before the S1ON signal is input in the CPU 40 is calculated, and in a case where it is determined that there is no difference in the signal amount or in a case where it is determined that there is a difference in the signal amount and the difference is not equal to or greater than a certain level, the AE/AWB detection unit 44 performs the AE processing and the AWB processing using the image data of two images.

In a case where it is determined that there is a difference in the signal amount and the difference is equal to or greater than the certain level, the AE/AWB detection unit 44 decides an image with a smaller signal amount in the entire screen as an AE target image and performs the AE processing and the AWB processing using the image data of the AE target image.

Also, as described above, the AE/AWB detection unit 44 may calculate integration values on the basis of R, G and B signals of the whole image data and perform the AE processing and the AWB processing, or may set an AE area and an AWB area in part of the image. In this case, a difference in the signal amount in the set AE area and the AWB area is calculated, and in a case where it is determined that there is not a difference or in a case where it is determined that there is a difference in the signal amount and the difference is not equal to or greater than a certain level, the AE processing and the AWB processing may be performed using the image data of the two images. In a case where it is determined that there is a difference in the signal amount and the difference is equal to or greater than the certain level, an image with a smaller signal amount in the AE area and the AWB area may be decided as a target image of the AE processing and the AWB processing, and the AE processing and the AWB processing may be performed using the image data of the target image of the AE processing and the AWB processing.

Second Embodiment

In the first embodiment of the presently disclosed subject matter, although a ghost is detected by correcting an image shift due to the parallax of an object image between the main pixel data and the sub-pixel data on the basis of the parallax map and calculating a difference in the pixel value (signal amount) between the main pixel and the sub-pixel after the image shift correction, a ghost detection method is not limited to this.

The second embodiment of the presently disclosed subject matter is a mode to detect a ghost without correcting an image shift. In the following, a monocular stereoscopic imaging device 10-1 according to the second embodiment is described. Since the monocular stereoscopic imaging device 10 according to the first embodiment and the monocular stereoscopic imaging device 10-1 according to the second embodiment are different only in AF processing, only the AF processing is described and the explanations of the others are omitted. Also, the same reference numerals are assigned to the same components as those of the first embodiment and the explanations are omitted.

Figure 10:
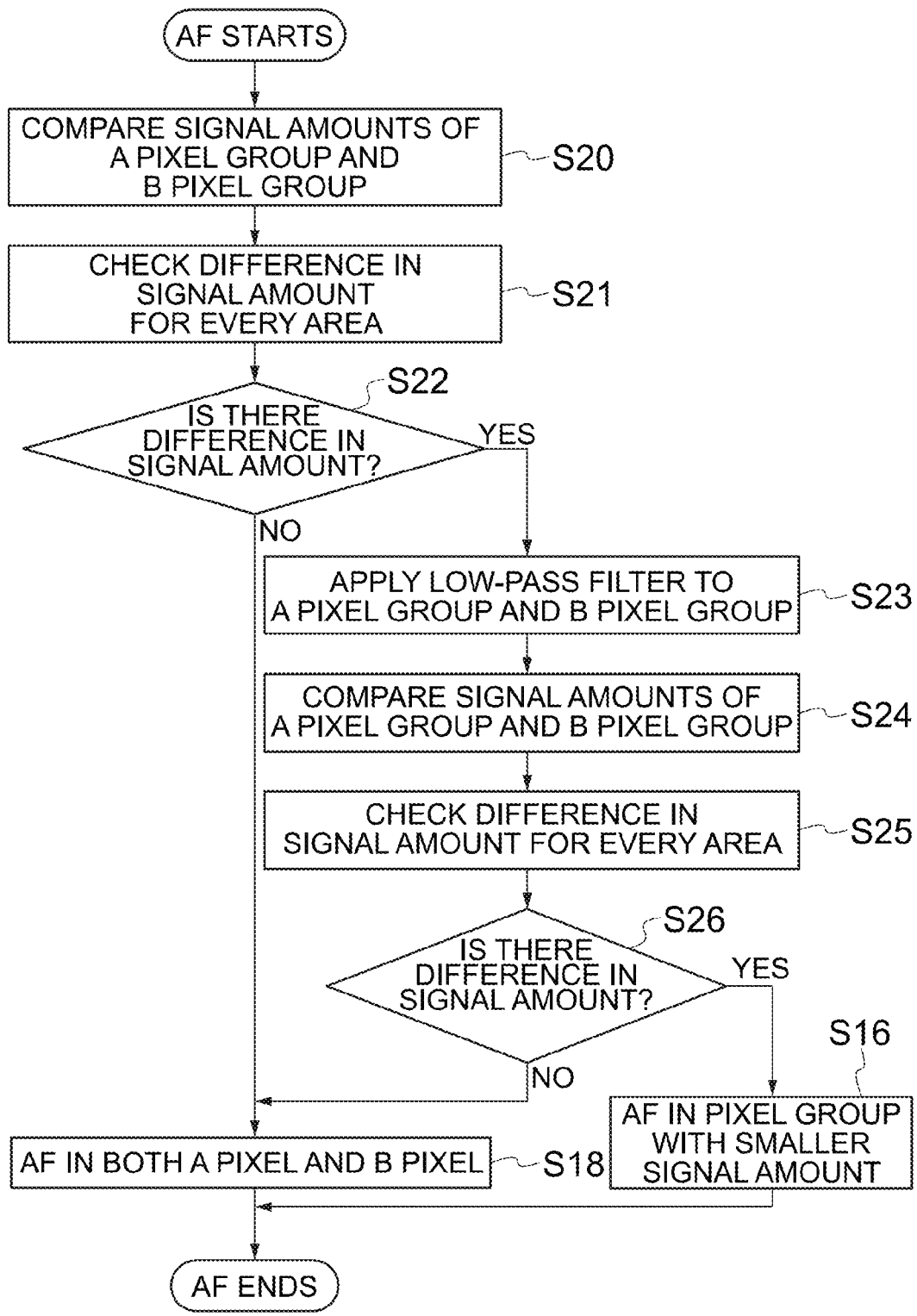
FIG. 10 is a flowchart illustrating a flow of one example of AF processing in a second embodiment.

FIG. 10 is a flowchart illustrating the flow of AF processing of a monocular stereoscopic imaging device 11. The CPU 40 acquires main pixel data and sub-pixel data, that is, left-eye image data and right-eye image data from the VRAM 50 and calculates a difference in the pixel value (signal amount) between the main pixel and the sub-pixel (step S20). By this means, difference data for one image is generated. Since there is a parallax between the main pixel and the sub-pixel, the difference data does not become 0.

The CPU 40 divides the difference data generated in step S20 into a plurality of regions and calculates an average value of the difference data in each region (step S21). The CPU 40 determines whether there is a difference in the signal amount difference, that is, whether there is a difference in the average value of the difference data calculated for each region (step S22). For example, it only has to calculate a standard deviation or variance of the average value of the difference data in each region, and if this is equal to or greater than a predetermined value, it is determined that there is the difference.

In the present embodiment, since a difference in the signal amount is calculated without correcting an image shift, if a ghost is not caused, the difference in the signal amount must become substantially constant regardless of the image position. Therefore, When there is a difference in the average value of the difference data, it shows that there is a high possibility that a ghost is caused. By this means, it is possible to easily determine a possibility of the occurrence of the ghost.

In a case where it is determined that there is a difference in the signal amount ("Yes" in step S22), the CPU 40 determines the occurrence of a ghost and the strength thereof. To be more specific, a low-pass filter is applied to each of the main pixel data and the sub-pixel data (step S23), a difference in the signal amount between the main pixel data and the sub-pixel data to which the low-pass filter is applied is calculated and difference data for one image is generated (step S24). Furthermore, the CPU 40 divides the difference data generated in step S24 into a plurality of regions and calculates the average value of the difference data in each region (step S25).

By a method similar to step S22, the CPU determines whether there is a difference in the signal amount, that is, whether there is a difference in the average value of the difference data calculated for each region (step S26). When a ghost is caused, a low frequency component is added. Although it is possible to eliminate the influence of an image shift by applying the low-pass filter, the influence of the ghost formed by the low frequency components remains. Therefore, when there is a difference in the signal amount even after the low-pass filter is applied, it can be determined that the ghost is caused in the image.

In a case where it is determined that there is a difference in the signal amount ("Yes" in step S26), the CPU 40 decides an image with a smaller signal amount in an AF area as an AF target image and inputs it in the AF processing unit 42. In the present embodiment, the image with a smaller signal amount in the AF area is defined as an image in which the ghost is not caused. The AF processing unit 42 performs the contrast AF processing on the basis of the image data in the AF area of the AF target image (step S16).

In a case where it is determined in step S22 that there is no difference in the signal amount ("No" in step S22) or in a case where it is determined in step S22 that there is a difference in the signal amount ("Yes" in step S22) and it is determined in step S26 that there is no difference in the signal amount ("No" in step S26), it shows a case where a ghost is not caused or even if the ghost is caused, it is a weak ghost having no influence on AF, that is, the case where the ghost is not caused, according to the presently disclosed subject matter. The AF processing unit 42 performs phase difference AF processing on the basis of signals in the AF area of the two images (step S18).

According to the present embodiment, since an image shift is not corrected, it is possible to determine whether a ghost is caused in a short time. Since it takes time to correct the image shift, it may not be appropriate in a case where corrected image data is continuously acquired, that is, in a case where a live view image or a moving image is taken, especially, in a case where the AF processing is continuously performed. However, it is possible to determine the occurrence of a ghost in a short time by using a low-pass filter.

Third Embodiment

In the first embodiment of the presently disclosed subject matter, in a case where a ghost is not caused or even if the ghost is caused, it is a weak ghost having no influence on AF, that is, in a case where the ghost according to the presently disclosed subject matter is not caused, the phase difference AF processing is performed on the basis of two images, and in a case where the ghost is strong, the contrast AF is performed on the basis of an image in which the ghost is not caused, but the mode of the AF processing is not limited to this.

The third embodiment of the presently disclosed subject matter is a mode to perform the phase difference AF processing using only a range in which a ghost is not caused even in a case where the ghost is strong. In the following, a monocular stereoscopic imaging device 10-2 according to the third embodiment is described. Since the monocular stereoscopic imaging device 10 according to the first embodiment and the monocular stereoscopic imaging device 10-2 according to the third embodiment are different only in the AF processing, only the AF processing is described and the explanations of the others are omitted. Also, the same reference numerals are assigned to the same components as those of the first embodiment and the explanations are omitted.

Figure 11:
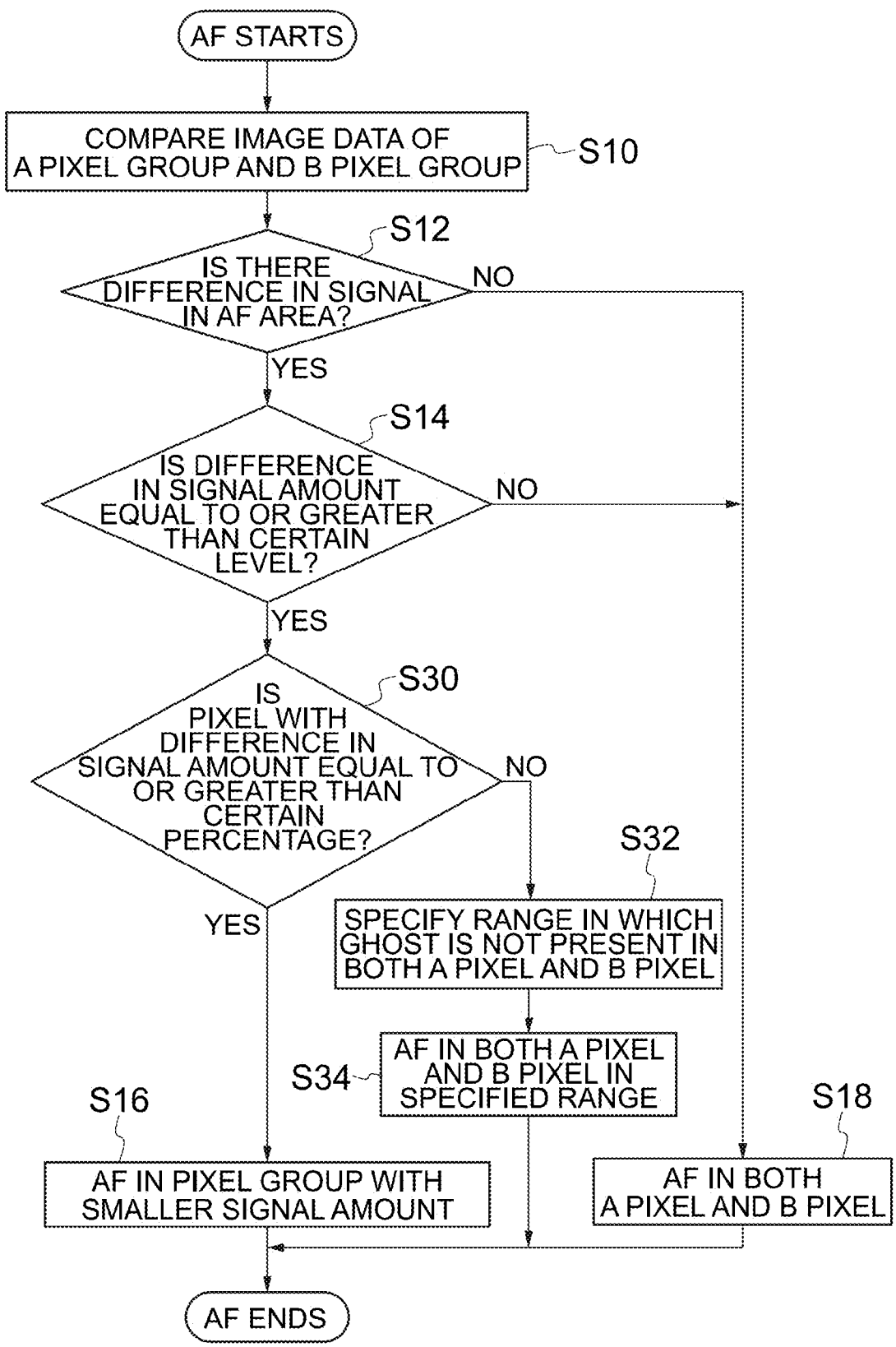
FIG. 11 is a flowchart illustrating a flow of one example of AF processing in a third embodiment.

FIG. 11 is a flowchart illustrating the flow of AF processing in the monocular stereoscopic imaging device 10-2.

To detect a ghost, the CPU 40 compares the main pixel data and the sub-pixel data acquired immediately before the S1ON signal is input in the CPU 40 (step S10). The CPU 40 determines whether there is a difference in the signal amount in an AF area, that is, whether the difference calculated in step S106 is not 0 (step S12). In a case where it is determined in step S12 that there is a difference in the signal amount ("Yes" in step S12), the CPU 40 determines whether the difference is equal to or greater than a certain level (step S14).

In a case where it is determined in step S14 that the difference is equal to or greater than the certain level ("Yes" in step S14), the CPU 40 determines whether a range in which there is a difference in the signal amount in the AF area has equal to or more than a certain percentage of the AF area (step S30). That is, it is determined whether a ratio of a region in which a ghost is caused in any of the main image data and the sub-image data to the AF area is equal to or greater than the certain ratio.

In a case where the range in which there is a difference in the signal amount in the AF area has equal to or greater than the certain percentage of the AF area (Yes in step S30), the CPU 40 decides an image with a smaller signal amount in the AF area as an AF target image and inputs it in the AF processing unit 42, and the AF processing unit 42 performs the contrast AF processing on the basis of the image data in the AF area of the AF target image (step S16).

Figure 12:
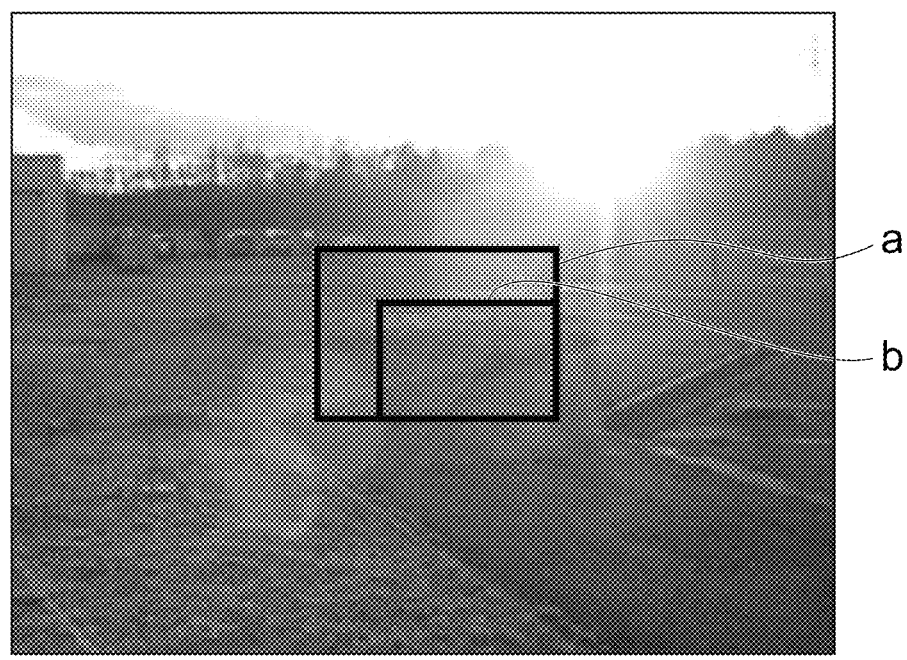
FIG. 12 illustrates main pixel data in which a ghost is caused.

In a case where the range in which there is a difference in the signal amount in the AF area does not have the certain percentage of the entire AF area ("No" in step S30), the CPU 40 specifies a region in which a ghost is not caused in both the main pixel data and the sub-pixel data, from the AF area of the main pixel data and the AF area of the sub-pixel data (step S32). For example, in a case where the main pixel data illustrated in FIG. 12 is input, the CPU 40 extracts region "b" in which a ghost is not caused in AF area "a." For example, it is possible to apply a low-pass filter to the image data in AF area "a" and extract a region in which there is no remaining signal as region "b" in which the ghost is not caused. By the similar method, the CPU 40 extracts a region in which a ghost is not caused, from the AF area of the sub-pixel data. Furthermore, the CPU 40 specifies an overlap between the region in which the ghost is not caused in the main pixel data and the region in which the ghost is not caused in the sub-pixel data, as a region in which the ghost is not caused in both the main pixel data and the sub-pixel data. The CPU 40 inputs information on the specified region in which the ghost is not caused in both the main pixel data and the sub-pixel data, in the AF processing unit 42. However, in the monocular stereoscopic imaging device 10-2, as illustrated in FIG. 6, since a position in which the ghost is caused varies between the main pixel data and the sub-pixel data, there are many cases where the ghost is not caused in the AF area of one image.

The AF processing unit 42 performs the phase difference AF processing on the basis of signals of the AF area of the two images in the region in which the ghost is not caused in both the main pixel data and the sub-pixel data in the AF area (step S34).

In a case where it is determined in step S12 that there is no difference in the signal amount ("No" in step S12) or in a case where it is determined in step S12 that there is a difference in the signal amount ("Yes" in step S12) and it is determined in step S14 that the difference is not equal to or greater than the certain level ("No" in step S14), since a case is assumed where the ghost is not caused, or even if the ghost is caused, it is a weak ghost that has no influence on AF, that is, the case where the ghost is not caused, according to the presently disclosed subject matter, the AF processing unit 42 performs the phase difference AF processing on the basis of signals in the AF area of the two images (step S18).

According to the present embodiment, even if the ghost is caused, it is possible to perform the phase difference AF processing in more cases. In general, since focusing is possible at a higher speed in the phase difference AF processing than the contrast AF processing, the phase difference AF processing is desired to be performed as much as possible. Therefore, even in a case where a strong ghost is detected, by specifying a range in which the ghost is caused in the AF area and using a range in which the ghost is not caused in the two images, the phase difference AF processing is enabled. Moreover, since the range in which the ghost is not caused is used, it is possible to avoid false focusing.

Also, in the present embodiment, it is determined whether the difference in the signal amount is equal to or greater than the certain level (step S14), and in a case where it is determined that the difference is equal to or greater than the certain level ("Yes" in step S14), it is determined whether a range in which there is a difference in the signal amount in the AF area has equal to or more than a certain percentage of the entire AF area (step 30). In a case where it does not have equal to or more than the certain percentage ("No" in step S30), the phase difference AF processing is performed on the basis of signals in the AF area of the two images in the region in which the ghost is not caused in both the main pixel data and the sub-pixel data in the AF area (steps S32 and S34). However, it is not essential to determine whether the difference in the signal amount is equal to or greater than the certain level. It is determined whether there is a difference in the signal amount in the AF area (step S12), and in a case where there is the difference in the signal amount ("Yes" in step S12), it may be determined whether a range in which there is the difference in the signal amount in the AF area has equal to or more than a certain percentage of the entire AF area (step S30).

Moreover, in the present embodiment, although a ghost is detected from the left-eye image data and the right-eye image data and AF processing is changed according thereto, the AE processing and the AWB processing may be changed according to the existence/nonexistence of occurrence of the ghost. For example, it is determined whether a difference in the signal amount is equal to or greater than a certain level, and in a case where it is determined that the difference is equal to or greater than the certain level, it is determined whether a range in which there is the difference in the signal amount has equal to or more than a certain percentage of the entire screen. In a case where it does not have equal to or more than the certain percentage, the AE processing and the AWB processing may be performed on the basis of the image signals of the two images in a region in which a ghost is not caused in both the main pixel data and the sub-pixel data.

Fourth Embodiment

In the first embodiment of the presently disclosed subject matter, in a case where a ghost is not caused or even if the ghost is caused, it is a weak ghost having no influence on AF, that is, in a case where the ghost is not caused, according to the presently disclosed subject matter, the phase difference AF processing is performed on the basis of the two images, and in a case where the ghost is strong, the contrast AF is performed on the basis of an image in which the ghost is not caused, but the mode of the AF processing is not limited to this.

The fourth embodiment of the presently disclosed subject matter is a mode to perform the phase difference AF processing using only a range in which a ghost is not caused even in a case where the ghost is strong. In the following, a monocular stereoscopic imaging device 10-3 according to the fourth embodiment is described. Since the monocular stereoscopic imaging device 10 according to the first embodiment and the monocular stereoscopic imaging device 10-3 according to the fourth embodiment are different only in the AF processing, only the AF processing is described and the explanations of the others are omitted. Also, the same reference numerals are assigned to the same components as those of the first to third embodiments and the explanations are omitted.

Figure 13:
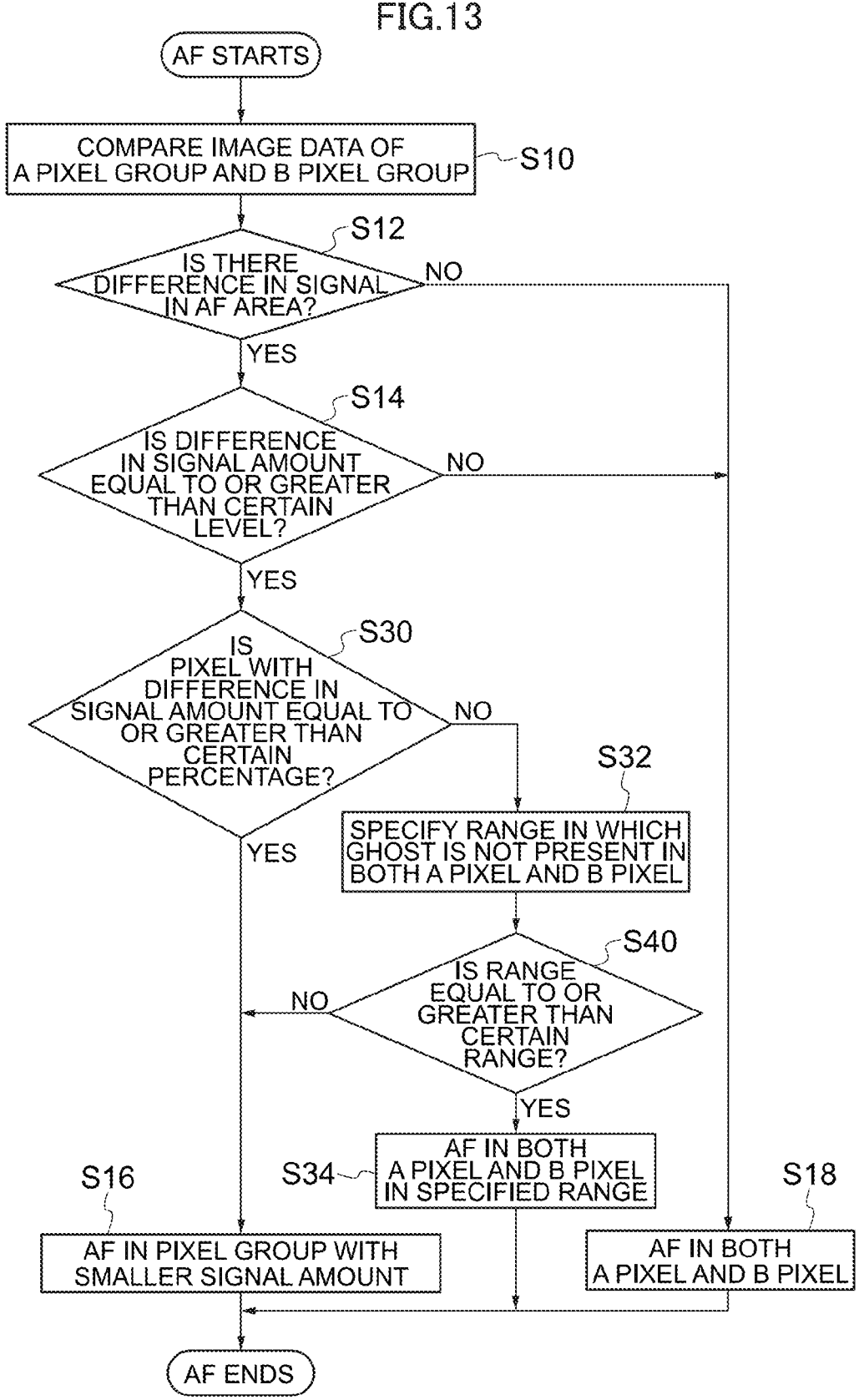
FIG. 13 is a flowchart illustrating a flow of one example of AF processing in a fourth embodiment; and In FIG. 14, portion (A) is a view illustrating main pixel data in which a ghost is caused, and portion (B) is a view illustrating sub-pixel data.

FIG. 13 is a flowchart illustrating the flow of the AF processing in the monocular stereoscopic imaging device 10-3.

To detect a ghost, the CPU 40 compares the main pixel data and the sub-pixel data acquired immediately before the S1ON signal is input in the CPU 40 (step S10). The CPU 40 determines whether there is a difference in the signal amount in an AF area, that is, whether the difference calculated in step S106 is not 0 (step S12). In a case where it is determined in step S12 that there is a difference in the signal amount ("Yes" in step S12), the CPU 40 determines whether the difference is equal to or greater than a certain level (step S14).

In a case where it is determined in step S14 that the difference is equal to or greater than the certain level ("Yes" in step S14), the CPU 40 determines whether a range in which there is a difference in the signal amount in the AF area has equal to or more than a certain percentage of the AF area (step S30).

In a case where the range in which there is a difference in the signal amount in the AF area does not have equal to or greater than the certain percentage of the entire AF area ("No" in step S30), the CPU 40 specifies a region in which a ghost is not caused in both the main pixel data and the sub-pixel data, from the AF area of the main pixel data and the AF area of the sub-pixel data (step S32). The CPU 40 inputs information on the specified region in which the ghost is not caused in both the main pixel data and the sub-pixel data, in the AF processing unit 42.

The CPU 40 determines whether the region specified in step S32 occupies equal to or more than a certain range in the AF area (step S40). In a case where it is more than the certain range ("Yes" in step S40), the AF processing unit 42 performs the phase difference AF processing on the basis of the AF area of the two images in the region in which the ghost is not caused in both the main pixel data and the sub-pixel data in the AF area specified in step S32 (step S42).

In a case where the range in which there is a difference in the signal amount in the AF area has equal to or more than the certain percentage of the entire AF area ("Yes" in step S30) or in a case where the region specified in step S32 does not occupy equal to or more than the certain range in the AF area ("No" in step S40), the CPU 40 decides an image with a smaller signal amount in the AF area as an AF target image and inputs it in the AF processing unit 42, and the AF processing unit 42 performs the contrast AF processing on the basis of the image data in the AF area of the AF target image (step S16).

Although a ghost is not often caused in the AF area of one image in the monocular stereoscopic imaging device 10-3, as illustrated in FIG. 14, there is a case where the ghost is caused in both the main pixel data and the sub-pixel data. Portion (A) of FIG. 14 indicates the main pixel data and portion (B) indicates the sub-pixel data. Since a position in which the ghost is caused varies between the main pixel data and the sub-pixel data, although region "b" in which the ghost is not caused in AF area "a" of the main pixel data is relatively large, region "c" in which the ghost is not caused in AF area "a" of the sub-pixel data is a small. Therefore, in such a case, a region in which the ghost is not caused in both the main pixel data and the sub-pixel data in the AF area becomes small, and the accuracy of the phase difference AF processing is deteriorated. Therefore, in such a case, it is possible to avoid false focusing by performing the contrast AF processing.

In a case where it is determined in step S12 that there is no difference in the signal amount ("No" in step S12) or in a case where it is determined in step S12 that there is a difference in the signal amount ("Yes" in step S12) and it is determined in step S14 that the difference is not equal to or greater than the certain level ("No" in step S14), since a case is assumed where the ghost is not caused, or even if the ghost is caused, it is a weak ghost that has no influence on AF, that is, the case where the ghost is not caused, according to the presently disclosed subject matter, the AF processing unit 42 performs the phase difference AF processing on the basis of signals in the AF area of the two images (step S18).

According to the present embodiment, the contrast AF processing can be performed in a case where the accuracy is low even after the phase difference AF processing is performed in a range in which a ghost is not caused in the two images, and the phase difference AF processing can be performed only when a range in which the ghost is not caused is enough for the phase difference AF processing. Therefore, it is possible to increase the accuracy of the AF processing and avoid false focusing.

Also, in the present embodiment, in a case where a region in which a ghost is not caused in the right-eye image data and the left-eye image data does not occupy equal to or more than a certain range in an AF area ("No" in step S40), the contrast AF processing is performed on the basis of the image data in the AF area of an image in which the ghost is not caused (step S16), but in this case, the contrast AF processing may be performed on each of the two images. By this means, it is possible to further increase the accuracy.

Also, in the present embodiment, it is determined whether the difference in the signal amount is equal to or greater than the certain level (step S14), and in a case where it is determined that the difference is equal to or greater than the certain level ("Yes" in step S14), it is determined whether a range in which there is a difference in the signal amount in the AF area has equal to or more than a certain percentage of the entire AF area (step 30). In a case where it does not have equal to or more than the certain percentage ("No" in step S30), the phase difference AF processing is performed on the basis of signals in the AF area of the two images in the region in which the ghost is not caused in both the main pixel data and the sub-pixel data in the AF area (steps S32 to S42). However, similarly to the third embodiment, it is not essential to determine whether the difference in the signal amount is equal to or greater than the certain level. It is determined whether there is a difference in the signal amount in the AF area (step S12), and in a case where there is a difference in the signal amount ("Yes" in step S12), it may be determined whether a range in which there is the difference in the signal amount in the AF area has equal to or more than a certain percentage of the entire AF area (step S30).

Fifth Embodiment

In the first embodiment of the presently disclosed subject matter, although a ghost is detected for all images, a place where a ghost is caused may be limited to a bright place (for example, outdoor) where sunshine may enter.

The fifth embodiment of the presently disclosed subject matter is a mode to check the brightness of an object and not perform processing for ghost determination with the assumption that a ghost is not caused in a dark place. In the following, a monocular stereoscopic imaging device 10-4 according to the fifth embodiment is described. Also, the explanations are omitted for the same components as those of the first embodiment.

When the shutter button is pressed halfway, the S1ON signal is input in the CPU 40 and the CPU 40 implements AE/AF operation by means of the AF processing unit 42 and the AE/AWB detection unit 44.

First, the CPU 40 detects the brightness of the object. The brightness of the object can be detected using the luminance signal (Y signal) of continuously acquired right-eye image data and left-eye image data. A method of detecting the brightness of the object is already known, and therefore the explanation is omitted.

The CPU 40 determines whether the brightness of the object is equal to or greater than certain brightness. It is possible to calculate the object luminance on the basis of the average integration value calculated in the AE/AWB detection unit 44 and determine whether the brightness of the object is equal to or greater than a certain level on the basis of the luminance. As for the luminance of the entire right-eye image data and the left-eye image data, the brightness at which there is a possibility of outdoor imaging may be set as certain brightness, and in a case where an average value of the luminance in the entire screen is equal to or greater than that brightness, the brightness of the object may be assumed to be equal to or greater than the certain brightness. Moreover, possible luminance of a light source is set as certain brightness, and in a case where there is a part with luminance equal to or greater than the brightness even in part of the right-eye image data or the left-eye image data, the brightness of the object may be assumed to be equal to or greater than the certain brightness. Also, a photometric system performed in the AE/AWB detection unit 44 is not limited to average photometry, and although various photometric systems such as central filling photometry and spot photometry can be used, it is desirable that photometry is performed with a focus on a photometric area used for automatic exposure in the present embodiment.

A place in which a ghost is caused may be limited to a bright place (for example, outdoor) under the sun. The brightness of the object is checked, and in a dark place, it is assumed that a ghost is not caused, and ghost discrimination processing is not performed. Here, since it is better as the operation time is shorter, it is desirable to perform processing that detects the luminance of the object first.

In a case where the brightness of the object is not equal to or greater than the certain brightness, since there is no possibility that the ghost is caused, the CPU 40 performs normal AF processing, here, AF processing in a phase difference detection system using two images.

In a case where the brightness of the object is equal to or greater than the certain brightness, the CPU 40 performs the AF processing illustrated in FIG. 5. Here, the AF processing illustrated in FIG. 5 is the same as the one in the monocular stereoscopic imaging device 10 according to the first embodiment, and therefore the explanation is omitted.

According to the present embodiment, since a ghost is detected and the AF processing is performed only when there is a possibility that the ghost is caused, it is possible to shorten the operation time. Since it takes a certain amount of computation time to calculate a difference in the signal amount between the main image data and the sub-image data, it is possible to minimize time-consuming computation processing by detecting a ghost only when there is a possibility that the ghost is caused.

Also, in the present embodiment, although an example using a CCD as an imaging element has been described, it is not limited to the CCD. The presently disclosed subject matter is applicable to other image sensors such as a CMOS.

Although the presently disclosed subject matter has been described using the embodiments, the technical scope of the presently disclosed subject matter is not limited to the ranges described in the above-mentioned embodiments. It is clear for those skilled in the art to be able to add various changes or improvements to the above-mentioned embodiments. It is clear from the description in the claims that such a changed or improved mode is also included in the technical scope of the presently disclosed subject matter.

For example, it is possible to use a phase difference CCD in the horizontal direction and the vertical direction, instead of the phase difference CCD in the horizontal direction as illustrated in FIG. 2. In this case, two pieces in the horizontal direction and two pieces in the vertical direction, that is, four pixels in total are included in one pixel and four image signals are acquired at a time. Even in a case where the four image signals are acquired, by selecting two desired images such as the upper left and upper right images, the upper left and lower left images and the upper left and lower right images, and performing processing with respect to the two selected images several times, it is possible to acquire the similar result. That is, although the description in the claims is intended for two images, the presently disclosed subject matter is not limited to a case where two images are acquired, and it is applicable to all cases where two or more images are acquired. Furthermore, in the present embodiments, a ghost is detected from the left-eye image data and the right-eye image data, and the AF processing, the AE processing and the AWB processing are changed according thereto, but what is changed according to the existence/nonexistence of occurrence of the ghost is not limited to these. For example, according to the existence/nonexistence of occurrence of the ghost, various kinds of processing based on image matching such as face recognition and automatic tracking may be changed.

The execution order of each processing such as operation, procedures, steps and stages in the device, the system, the program and the method shown in the claims, the specification and the drawings is not specifically specified like "prior to" or "in advance," and it should be noted that, unless the output of previous processing is used in subsequent processing, they can be realized in an arbitrary order. As for the operation flows in the claims, the specification and the drawings, even if an explanation is given using "first" and "next" or the like, it does not mean that implementation in this order is essential.

What is claimed is:

1. An imaging device comprising:
   an image acquisition unit configured to receive light fluxes passing through different regions in a single imaging optical system and acquire two images;
   a ghost detection unit configured to detect a ghost by comparing the two acquired images;
   a determination unit configured to determine whether the detected ghost is not in at least one of the two acquired images; and
   a control unit configured to perform at least one of an automatic focus control, an automatic exposure control and an automatic white balance control using an image for which the determination unit has determined that said image does not include the ghost,
   wherein
   said determination unit is further configured to determine whether a strength of the ghost in said at least one of the two images is equal to or greater than a certain strength,
   wherein the control unit performs at least one of the automatic focus control, the automatic exposure control and the automatic white balance control, based on the two images, in a case where the determination unit determines that the strength of the ghost caused in at least one of the two images is not equal to or greater than the certain strength.

2. The imaging device according to claim 1, wherein the determination unit determines whether the ghost is detected in a region set in each of the two images.

3. The imaging device according to claim 2, wherein
   said determination unit is further configured to determine whether a strength of the ghost in said at least one of the two images is equal to or greater than a certain strength,
   wherein the control unit performs at least one of the automatic focus control, the automatic exposure control and the automatic white balance control, based on the two images, in a case where the determination unit determines that the strength of the ghost caused in at least one of the two images is not equal to or greater than the certain strength.

4. The imaging device according to claim 3, wherein
   said determination unit is further configured to determine whether a ratio of a region in which the detected ghost is in at least one of the two images to the set region is equal to or greater than a certain ratio,
   wherein the control unit performs at least one of the automatic focus control, the automatic exposure control and the automatic white balance control using the two images in a case where the determination unit determines that the ratio of the region in which the ghost is in at least one of the two images to the set region is less than the certain ratio.

5. The imaging device according to claim 2, wherein
   said determination unit is further configured to detect a region in which the ghost is not in both of the two images in a case where the determination unit determines that the ghost is detected in said at least one of the two images, and determines whether a ratio of the detected region to the set region is equal to or greater than a certain ratio,
   wherein the control unit performs at least one of the automatic focus control, the automatic exposure control and the automatic white balance control using an image for which the determination unit has determined that said image does not include the ghost, in a case where the determination unit determines that the ghost is detected in at least one of the two images and the determination unit determines that the ratio of the region in which the ghost is not in both of the two images to the set region is less than the certain ratio, and the control unit performs at least one of the automatic focus control, the automatic exposure control and the automatic white balance control based on the region in which the ghost is not in both of the two images in a case where the determination unit determines that the ghost is detected in at least one of the two images and the determination unit determines that the ratio of the region in which the ghost is not in both of the two images to the set region is equal to or greater than the certain ratio.

6. The imaging device according to claim 1,
wherein the ghost detection unit detects the ghost by calculating an image shift amount due to a parallax of an object image between the two images, correcting an image shift between the two images based on the calculated image shift amount and calculating a difference in a pixel value between corresponding pixels of the two images after the image shift is corrected.

7. The imaging device according to claim 1,
wherein the ghost detection unit detects the ghost by applying a low-pass filter to each of the two images and calculating a difference between the two images to which the low-pass filter is applied.

8. The imaging device according to claim 1,
wherein, in a case where the determination unit determines that the detected ghost is not in the two images, at least one of the automatic focus control, the automatic exposure control and the automatic white balance control is performed based on the two images.

9. The imaging device according to claim 3,
wherein, in a case where the automatic focus control is performed based on an image for which it is determined that the ghost is not in the two images, the control unit performs the automatic focus control based on an evaluation value indicating an in-focus state, and
in a case where the automatic focus control is performed based on the two images, the control unit performs the automatic focus control based on a phase difference between the two images.

10. The imaging device according to claim 1, wherein
said determination unit is further configured to determine whether a brightness of an object is equal to or greater than a certain brightness,
wherein the ghost detection unit detects the ghost only in a case where the determination unit determines that the brightness of the object is equal to or greater than the certain brightness.

11. An imaging method comprising:
a step of receiving light fluxes passing through different regions in a single imaging optical system and acquiring two images;
a step of detecting a ghost by comparing the two acquired images;
a step of determining whether the detected ghost not in at least one of the two acquired images; and
a step of performing at least one of an automatic focus control, an automatic exposure control and an automatic white balance control using an image for which the determining step has determined that said image does not include the ghost,
wherein
said step of determining unit is further configured to determine whether a strength of the ghost in said at least one of the two images is equal to or greater than a certain strength,
wherein said step of performing further includes performing at least one of the automatic focus control, the automatic exposure control and the automatic white balance control, based on the two images, in a case where the step of determining determines that the strength of the ghost caused in at least one of the two images is not equal to or greater than the certain strength.

12. A non-transitory computer-readable recording medium including instructions stored thereon, such that when the instructions are read and executed by a processor, the processor is configured to perform:
a step of receiving light fluxes passing through different regions in a single imaging optical system and acquiring two images;
a step of detecting a ghost by comparing the two acquired images;
a step of determining whether the detected ghost not in at least one of the two acquired images; and
a step of performing at least one of an automatic focus control, an automatic exposure control and an automatic white balance control using an image for which the determination unit has determined that said image does not include the ghost,
wherein
said step of determining unit is further configured to determine whether a strength of the ghost in said at least one of the two images is equal to or greater than a certain strength,
wherein said step of performing further includes performing at least one of the automatic focus control, the automatic exposure control and the automatic white balance control, based on the two images, in a case where the step of determining determines that the strength of the ghost caused in at least one of the two images is not equal to or greater than the certain strength.

13. An imaging device comprising:
an image acquisition unit configured to receive light fluxes passing through different regions in a single imaging optical system and acquire two images;
a ghost detection unit configured to detect a ghost by comparing the two acquired images;
a determination unit configured to determine whether the detected ghost is not in at least one of the two acquired images; and
a control unit configured to perform at least one of an automatic focus control, an automatic exposure control and an automatic white balance control using an image for which the determination unit has determined that said image does not include the ghost,
wherein
said determination unit is further configured to determine whether a brightness of an object is equal to or greater than a certain brightness,
wherein the ghost detection unit detects the ghost only in a case where the determination unit determines that the brightness of the object is equal to or greater than the certain brightness.

14. An imaging device comprising:
an image acquisition unit configured to receive light fluxes passing through different regions in a single imaging optical system and acquire two images;

a ghost detection unit configured to detect a ghost by comparing the two acquired images;

a determination unit configured to determine whether the detected ghost is not in at least one of the two acquired images; and a control unit configured to perform at least one of an automatic focus control, an automatic exposure control and an automatic white balance control using an image for which the determination unit has determined that said image does not include the ghost, wherein the determination unit determines whether the ghost is detected in a region set in each of the two images, wherein said determination unit is further configured to determine whether a strength of the ghost in said at least one of the two images is equal to or greater than a certain strength, wherein the control unit performs at least one of the automatic focus control, the automatic exposure control and the automatic white balance control, based on the two images, in a case where the determination unit determines that the strength of the ghost caused in at least one of the two images is not equal to or greater than the certain strength.

15. The imaging device according to claim 13, wherein said determination unit is further configured to determine whether a ratio of a region in which the detected ghost is in at least one of the two images to the set region is equal to or greater than a certain ratio, wherein the control unit performs at least one of the automatic focus control, the automatic exposure control and the automatic white balance control using the two images in a case where the determination unit determines that the ratio of the region in which the ghost is in at least one of the two images to the set region is less than the certain ratio.

16. The imaging device according to claim 13, wherein, in a case where the automatic focus control is performed based on an image for which it is determined that the ghost is not in the two images, the control unit performs the automatic focus control based on an evaluation value indicating an in-focus state, and in a case where the automatic focus control is performed based on the two images, the control unit performs the automatic focus control based on a phase difference between the two images.

17. An imaging device comprising:

an image acquisition unit configured to receive light fluxes passing through different regions in a single imaging optical system and acquire two images;

a ghost detection unit configured to detect a ghost by comparing the two acquired images;

a determination unit configured to determine whether the detected ghost is not in at least one of the two acquired images; and a control unit configured to perform at least one of an automatic focus control, an automatic exposure control and an automatic white balance control using an image for which the determination unit has determined that said image does not include the ghost, wherein the determination unit determines whether the ghost is detected in a region set in each of the two images, wherein said determination unit is further configured to detect a region in which the ghost is not in both of the two images in a case where the determination unit determines that the ghost is detected in said at least one of the two images, and determines whether a ratio of the detected region to the set region is equal to or greater than a certain ratio, wherein the control unit performs at least one of the automatic focus control, the automatic exposure control and the automatic white balance control using an image for which the determination unit has determined that said image does not include the ghost, in a case where the determination unit determines that the ghost is detected in at least one of the two images and the determination unit determines that the ratio of the region in which the ghost is not in both of the two images to the set region is less than the certain ratio, and the control unit performs at least one of the automatic focus control, the automatic exposure control and the automatic white balance control based on the region in which the ghost is not in both of the two images in a case where the determination unit determines that the ghost is detected in at least one of the two images and the determination unit determines that the ratio of the region in which the ghost is not in both of the two images to the set region is equal to or greater than the certain ratio.

* * * * *